US012420386B2

(12) United States Patent
Zheng et al.

(10) Patent No.: US 12,420,386 B2
(45) Date of Patent: Sep. 23, 2025

(54) POWER TOOL

(71) Applicant: Nanjing Chervon Industry Co., Ltd., Nanjing (CN)

(72) Inventors: Hanqing Zheng, Nanjing (CN); Xiangqing Fu, Nanjing (CN); Changwei Zuo, Nanjing (CN); Shubin Tong, Nanjing (CN); Xu Wang, Nanjing (CN); Binbin Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 12 days.

(21) Appl. No.: 18/347,633

(22) Filed: Jul. 6, 2023

(65) Prior Publication Data

US 2023/0339081 A1 Oct. 26, 2023

Related U.S. Application Data

(63) Continuation-in-part of application No. 18/299,898, filed on Apr. 13, 2023, now Pat. No. 12,304,051,
(Continued)

(30) Foreign Application Priority Data

Feb. 22, 2022 (CN) ......................... 202210160116.6
Mar. 22, 2023 (CN) ......................... 202310286394.0
(Continued)

(51) Int. Cl.
*B25B 21/00* (2006.01)
*B25B 23/00* (2006.01)
(Continued)

(52) U.S. Cl.
CPC .......... *B25B 21/00* (2013.01); *B25B 23/0014* (2013.01); *B25B 23/0028* (2013.01); *B25F 5/001* (2013.01); *B25B 23/18* (2013.01)

(58) Field of Classification Search
CPC . B25B 21/00; B25B 23/0014; B25B 23/0028; B25B 23/18; B25F 5/001
See application file for complete search history.

(56) References Cited

U.S. PATENT DOCUMENTS

| | | | | |
|---|---|---|---|---|
| 4,114,401 A * | 9/1978 | Van Hoose | F16D 3/2052 81/177.75 |
| 4,721,493 A * | 1/1988 | Lane | F16H 1/006 464/157 |

(Continued)

FOREIGN PATENT DOCUMENTS

| | | |
|---|---|---|
| CN | 203993684 U | 12/2014 |
| CN | 103963016 A | 5/2016 |

(Continued)

OTHER PUBLICATIONS

International Search Report and Written Opinion of international application No. PCT/CN23/74214, mailed May 18, 2023, 9 pp. (Translation of Search Report only).

(Continued)

*Primary Examiner* — Dariush Seif
(74) *Attorney, Agent, or Firm* — Greenberg Traurig, LLP

(57) ABSTRACT

A power tool includes a main housing, a drive mechanism, a working head, and a connection assembly. The connection assembly includes an input portion connected to the drive mechanism and an output portion connected to an output shaft. The connection assembly rotates the working head about a first axis relative to the main housing. The power tool includes a first transmission path. When the working head rotates about the first axis relative to the main housing,
(Continued)

components in the first transmission path are allowed to deform or to be displaced along a direction of the first transmission path.

17 Claims, 15 Drawing Sheets

Related U.S. Application Data which is a continuation of application No. PCT/CN2023/074214, filed on Feb. 2, 2023.

(30) Foreign Application Priority Data

Mar. 22, 2023 (CN) ......................... 202320583788.8
Mar. 22, 2023 (CN) ......................... 202320585598.X

(51) Int. Cl.
*B25B 23/18* (2006.01)
*B25F 5/00* (2006.01)

(56) References Cited

U.S. PATENT DOCUMENTS

| | | | | |
|---|---|---|---|---|
| 4,748,872 | A * | 6/1988 | Brown | B25B 21/001 81/57.26 |
| 4,753,626 | A * | 6/1988 | Hazebrook | B25B 23/0014 464/140 |
| 4,941,862 | A * | 7/1990 | Hazebrook | F16D 3/221 81/177.85 |
| 5,251,706 | A * | 10/1993 | Evans | B25B 21/004 173/217 |
| 5,291,809 | A * | 3/1994 | Fox, III | B25B 23/0035 81/177.85 |
| 5,409,332 | A * | 4/1995 | Chabot, Jr. | F16D 3/207 403/114 |
| 5,533,581 | A * | 7/1996 | Barth | B23Q 5/045 173/217 |
| 5,660,491 | A * | 8/1997 | Roberts | B25B 23/0014 81/177.85 |
| 5,784,934 | A * | 7/1998 | Izumisawa | B25B 21/004 81/177.8 |
| 5,943,925 | A * | 8/1999 | Huang | B25G 1/007 81/177.1 |
| 6,050,989 | A * | 4/2000 | Fox | A61B 17/32002 606/1 |
| 6,092,441 | A * | 7/2000 | Jarvis | B25B 23/0021 81/177.2 |
| 6,167,787 | B1 * | 1/2001 | Jarvis | B25B 23/0021 81/177.8 |
| 6,311,583 | B1 * | 11/2001 | Izumisawa | B25G 1/066 81/177.8 |
| 6,382,058 | B1 * | 5/2002 | Owoc | B25G 1/007 81/177.8 |
| 6,796,385 | B1 * | 9/2004 | Cobzaru | B25B 23/141 173/29 |
| 6,928,902 | B1 * | 8/2005 | Eyssallenne | B25F 5/02 81/57.44 |
| 6,935,212 | B2 * | 8/2005 | Wadsworth | B25B 13/46 81/62 |
| 7,029,274 | B1 * | 4/2006 | Capps | A61D 5/00 433/125 |
| 9,266,230 | B2 * | 2/2016 | Maddilate | B25F 5/02 |
| 9,884,410 | B1 * | 2/2018 | Ford | B25B 23/0021 |
| 11,098,765 | B2 * | 8/2021 | Yu | B25B 23/0014 |
| 11,235,454 | B2 * | 2/2022 | Sabin | B24B 23/02 |
| 11,806,844 | B2 * | 11/2023 | Beer | B25B 21/004 |
| 2003/0095842 | A1 * | 5/2003 | Bone | B25F 5/02 408/234 |
| 2006/0011367 | A1 * | 1/2006 | Teng | B25F 5/00 173/217 |
| 2006/0262519 | A1 * | 11/2006 | Hirschburger | B25F 5/021 362/119 |
| 2007/0234854 | A1 * | 10/2007 | Collins | B25B 21/004 81/58.1 |
| 2007/0259723 | A1 * | 11/2007 | Bertani | B23B 45/00 464/134 |
| 2008/0064007 | A1 * | 3/2008 | Carron | A61C 17/005 433/132 |
| 2008/0178709 | A1 * | 7/2008 | Chen | B25B 23/0028 81/57.13 |
| 2008/0220392 | A1 * | 9/2008 | Carron | A61C 17/005 433/125 |
| 2009/0041535 | A1 * | 2/2009 | Hu | F16D 3/40 403/57 |
| 2010/0015568 | A1 * | 1/2010 | Carron | A61C 1/12 433/130 |
| 2010/0196846 | A1 * | 8/2010 | Carron | A61C 1/12 433/116 |
| 2010/0196847 | A1 * | 8/2010 | Carron | A61C 1/12 433/125 |
| 2011/0197719 | A1 * | 8/2011 | Neitzell | B25F 5/001 81/177.75 |
| 2011/0229255 | A1 * | 9/2011 | Su | B25B 13/48 403/122 |
| 2014/0338504 | A1 * | 11/2014 | Beer | B25B 23/00 81/57.39 |
| 2016/0053803 | A1 * | 2/2016 | Yu | F16D 3/38 403/57 |
| 2016/0229040 | A1 * | 8/2016 | Yang | B25B 13/04 |
| 2016/0271711 | A1 | 9/2016 | Qian | |
| 2018/0325574 | A1 * | 11/2018 | Bjork | A61B 17/1631 |
| 2019/0084131 | A1 * | 3/2019 | Yang | B25B 23/0028 |
| 2020/0072294 | A1 * | 3/2020 | Chen | F16D 3/20 |
| 2020/0338700 | A1 * | 10/2020 | Chen | B25B 23/0014 |
| 2021/0156434 | A1 * | 5/2021 | Yu | F16D 3/2057 |
| 2021/0205966 | A1 * | 7/2021 | Ho | B25B 23/0028 |
| 2021/0301880 | A1 * | 9/2021 | Su | F16D 3/20 |
| 2022/0241938 | A1 * | 8/2022 | Chen | B25B 23/0035 |
| 2022/0274233 | A1 * | 9/2022 | Wu | B25B 21/026 |
| 2022/0324086 | A1 * | 10/2022 | Beer | B25B 23/0014 |
| 2023/0264338 | A1 * | 8/2023 | Zheng | B25F 5/00 173/217 |
| 2023/0339081 | A1 * | 10/2023 | Zheng | B25B 23/0028 |
| 2024/0026916 | A1 * | 1/2024 | Shahmohammadi | F16B 23/00 |

FOREIGN PATENT DOCUMENTS

| | | | |
|---|---|---|---|
| CN | 111791190 | A | 10/2020 |
| DE | 102013204225 | A1 | 9/2014 |
| EP | 0408987 | B1 | 12/1994 |
| WO | 2013084554 | A1 | 6/2013 |
| WO | 2023160348 | A1 | 8/2023 |

OTHER PUBLICATIONS

Extended European Search Report from European application No. 23182556.3, dated Dec. 22, 2023, 6 pp.

Office Action from Canadian application number 3,198,899, dated Oct. 25, 2024, 2 pp.

* cited by examiner

POWER TOOL

RELATED APPLICATION INFORMATION

This application is a continuation-in part of U.S. application Ser. No. 18/299,898, filed Apr. 13, 2023, which application is a continuation of International Application Number PCT/CN2023/074214, filed on Feb. 2, 2023, through which this application also claims the benefit under 35 U.S.C. § 119(a) of Chinese Patent Application No. 202210160116.6, filed on Feb. 22, 2022. This application further claims the benefit under 35 U.S.C. § 119(a) of Chinese Patent Application No. 202310286394.0, filed on Mar. 22, 2023, Chinese Patent Application No. 202320585598.X, filed on Mar. 22, 2022, and Chinese Patent Application No. 202320583788.8, filed on Mar. 22, 2022. All of these applications are incorporated herein by reference in their entirety.

BACKGROUND

Power tools include hand-held power tools and benchtop power tools. Higher demands are placed on the flexibility of working conditions and the compactness of the hand-held power tools aimed at DIY enthusiasts and home users among the hand-held power tools.

In the related art, rotary hand-held power tools such as screwdrivers and drill tools are generally available in either a straight profile or an angular profile to adapt to different usage scenarios. In some cases where straight and angular tools must work together, both tools must be on hand for constant alternation.

SUMMARY

A power tool includes a main housing provided with an accommodation space; a drive mechanism at least partially accommodated in the accommodation space and including a motor; a working head including an output shaft, where the output shaft is driven by the drive mechanism to rotate about an output axis; and a connection assembly including an input portion connected to the drive mechanism and an output portion connected to the output shaft, where the connection assembly rotates the working head about a first axis relative to the main housing. The power tool includes a first transmission path, the first transmission path is a torque transmission path from the drive mechanism through the connection assembly to the output shaft, and when the working head rotates about the first axis relative to the main housing, components in the first transmission path are allowed to deform or to be displaced along a direction of the first transmission path.

In some examples, the working head includes a limit position for making the working head move about the first axis to a limit, where when the working head is located at the limit position, the included angle α between an axis of the input portion and an axis of the output portion is less than or equal to 85 degrees.

In some examples, the working head includes a limit position for making the working head move about the first axis to a limit, where when the working head is located at the limit position, the included angle α between an axis of the input portion and an axis of the output portion is less than or equal to 70 degrees.

In some examples, the working head further includes a first position for making the axis of the input portion parallel to or coincident with the axis of the output portion.

In some examples, the limit position includes a first limit position for making the working head move along a first direction about the first axis to a limit, and the first limit position is located on a side of the first position.

In some examples, the limit position further includes a second limit position for making the working head move along a second direction opposite to the first direction about the first axis to a limit, and the first limit position and the second limit position are located on two sides of the first position.

In some examples, the ratio of the output torque of the output shaft when the working head is located at the limit position to the output torque of the output shaft when the working head is located at the first position is greater than or equal to 0.5 and less than or equal to 1.

In some examples, when the working head is located at the first position, the output torque of the output shaft is greater than or equal to 2.5 N·m.

In some examples, the ratio of the distance L1 between the first axis and a front end of the output shaft to the maximum distance L between a rear end of the main housing and the front end of the output shaft is greater than or equal to 0.1 and less than or equal to 0.4.

In some examples, the ratio of the distance L1 between the first axis and a front end of the output shaft to the maximum distance L between a rear end of the main housing and the front end of the output shaft is greater than or equal to 0.1 and less than or equal to 0.3.

In some examples, the drive mechanism includes a direct current power supply.

In some examples, the direct current power supply includes a battery and has a nominal voltage less than or equal to 7.2 V.

In some examples, the ratio of the length L2 of the direct current power supply to the maximum distance L between a rear end of the main housing and a front end of the output shaft is greater than or equal to 0.1 and less than or equal to 0.6.

In some examples, when the working head rotates about the first axis relative to the main housing, the connection assembly is allowed to deform.

In some examples, when the working head rotates about the first axis relative to the main housing, at least one of the drive mechanism, the input portion, the output portion, and the output shaft is allowed to be displaced along the direction of the first transmission path.

A power tool includes a main housing provided with an accommodation space; a drive mechanism at least partially accommodated in the accommodation space and including a direct current power supply and a motor; a working head including an output shaft, where the output shaft is driven by the drive mechanism to rotate about an output axis; and a connection assembly connecting the output shaft to the drive mechanism and including at least one connector, where the at least one connector provides at least two orthogonal rotational degrees of freedom to rotate the working head about a first axis relative to the main housing.

A power tool includes a main housing provided with an accommodation space; a drive mechanism at least partially accommodated in the accommodation space and including a direct current power supply and a motor; a working head including an output shaft, where the output shaft is driven by the drive mechanism to rotate about an output axis; and a connection assembly connecting the output shaft to the drive mechanism and including at least one connector, where the at least one connector provides at least two orthogonal rotational degrees of freedom to rotate the working head about a first axis relative to the main housing. The ratio of the distance L1 between the first axis and a front end of the output shaft to the maximum distance L between a rear end of the main housing and the front end of the output shaft is greater than or equal to 0.1 and less than or equal to 0.4.

In some examples, the ratio of the distance L1 between the first axis and the front end of the output shaft to the maximum distance L between the rear end of the main housing and the front end of the output shaft is greater than or equal to 0.1 and less than or equal to 0.3.

In some examples, the working head includes a limit position for making the working head move about the first axis to a limit, where when the working head is located at the limit position, the included angle α between an axis of the motor and an axis of the output shaft is less than or equal to 85 degrees.

In some examples, the direct current power supply includes a battery and has a nominal voltage less than or equal to 7.2 V, and the maximum output torque of the output shaft is greater than or equal to 2.5 N·m.

DETAILED DESCRIPTION

In order that the preceding object, features, and advantages of the present application can be more apparent and easier to understand, examples of the present application are described below in detail in conjunction with drawings. Numerous specific details are set forth below to facilitate a thorough understanding of the present application. However, the present application can be implemented in many other manners than those described herein, and those skilled in the art may make similar modifications without departing from the connotation of the present application. Therefore, the present application is not limited by the examples disclosed below.

In the description of the present application, the terms "joined", "connected", and "fixed" are to be understood in a broad sense unless otherwise expressly specified and limited. For example, the term "connected" may refer to "fixedly connected", "detachably connected", or integrated, may refer to "mechanically connected" or "electrically connected", or may refer to "connected directly", "connected indirectly through an intermediary", "connected inside two elements", or "interaction relations between two elements". For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

The present application is described below in detail in conjunction with drawings and examples.

Figure 1:
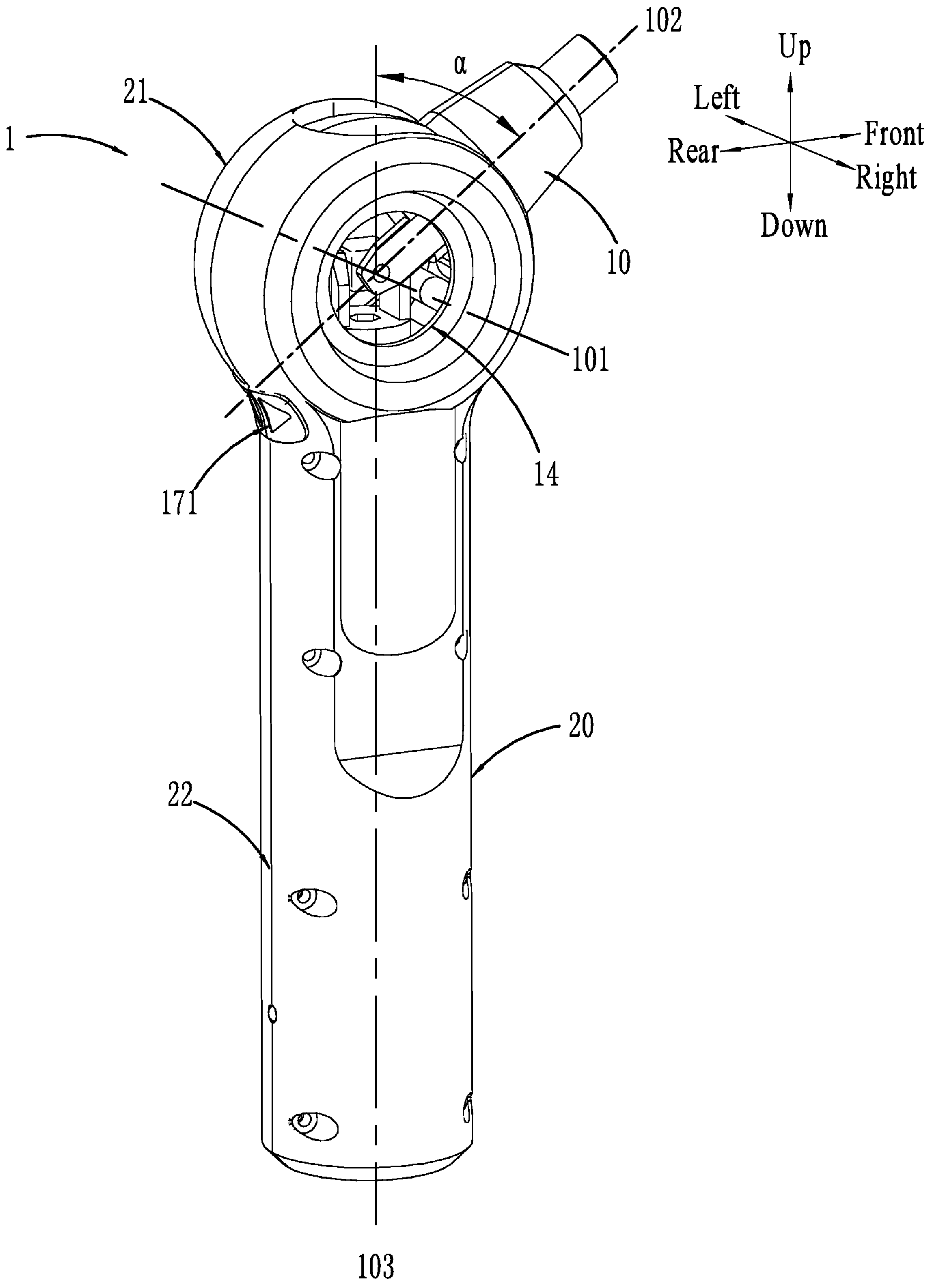
FIG. 1 is a perspective view of a power tool of an example of the present application.

To describe technical solutions of the present application clearly, the directions "up", "down", "left", "right", "front", and "rear" as shown in FIG. 1 are further defined.

As shown in FIGS. 1 to 6, a power tool 1 includes a working head 10, a main housing 20, and a drive mechanism 30. The working head 10 may output power directly or may be connected to another working accessory to output power. According to different working modes or output power of the working head 10, the power tool 1 may be corresponding tools, such as a screwdriver, a drill, or a wrench. The working head 10 is connected to an end of the main housing 20 and rotates relative to the main housing 20 about a first axis 101 under the action of an external force. The working head 10 is connected to the drive mechanism 30 and outputs power under the action of the drive mechanism 30.

The working head 10 includes an output shaft 11, and the output shaft 11 is driven by the drive mechanism 30 to rotate about a second axis 102. In this example, the screwdriver is used as an example, and a mounting slot 111 for mounting different bits is further formed at an end of the output shaft 11.

The whole main housing 20 extends along the direction of a third axis 103. The main housing 20 includes a grip 22 and a connection portion 21. The connection portion 21 is formed at or connected to an end of the grip 22, and the connection portion 21 is configured to connect the working head 10. The connection portion 21 is formed with a first accommodation space, and the grip 22 is formed with a second accommodation space, where the first accommodation space and the second accommodation space communicate with each other. Most of the drive mechanism 30 is disposed in the second accommodation space formed by the grip 22.

The working head 10 further includes a moving portion 12 connected to the main housing 20 and rotating relative to the main housing 20 about the first axis 101. The moving portion 12 is movably connected to the connection portion 21 or is disposed in the first accommodation space. In this example, the working head 10 further includes an output shaft housing 13, where the output shaft housing 13 is wrapped on the periphery of the output shaft 11 and connected to or integrally formed with the moving portion 12.

The connection portion 21 is provided with a rotation slot 211, where the output shaft 11 extends out of the rotation slot 211, and the moving portion 12 is limited in the rotation slot 211. The connection portion 21 includes an arc-shaped or arc-like guide portion, and the working head 10 moves along the guide portion. In some examples, the rotation slot 211 may be a closed slot body formed with a space in which the moving portion 12 is placed. In some examples, the rotation slot 211 may be an open slot and has a limiting portion for limiting the movement of the moving portion 12. The limiting portion is provided so that a limiting slot with an opening is formed by the rotation slot 211 in the first accommodation space. The output shaft 11 extends out of the rotation slot 211, and the outer diameter of an end of the output shaft 11 connected to the moving portion 12 is approximately equal to the width of the rotation slot so that the end is engaged with the rotation slot 211. The rotation slot 211 is disposed on the peripheral side (that is, the side around the first axis 101) of the connection portion 21. In this example, the peripheral side of the connection portion 21 is a curved surface, and the moving portion 12 is a curved surface corresponding to the peripheral side of the connection portion in shape. The surface of the moving portion 12 fits around the inner surface of the connection portion 21 so that the moving portion 12 is movable along the rotation slot 211 on the connection portion 21.

Figure 2:
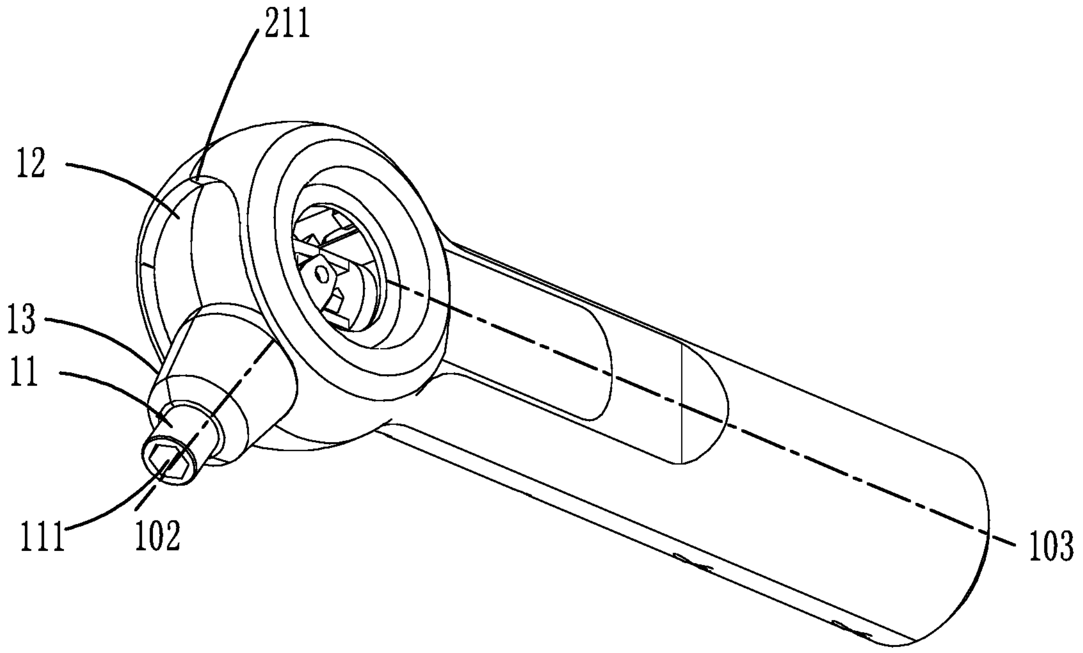
FIG. 2 is a perspective view of the power tool from another angle of view in FIG. 1.

As shown in FIGS. 1 and 2, the rotation slot 211 has a certain length corresponding to the rotation stroke of the working head 10 relative to the main housing 20 about the first axis 101. It is to be understood that the length of an arc over which the working head rotates is the preceding rotation stroke. The angle of the arc is $\alpha$, where $\alpha$ is greater than or equal to 0° and less than or equal to 90°. In some examples, $\alpha$ is greater than or equal to 0° and less than or equal to 60°. In some examples, a is greater than or equal to 0° and less than or equal to 30°. In some examples, a is greater than or equal to 0° and less than or equal to 16°.

Figure 3:
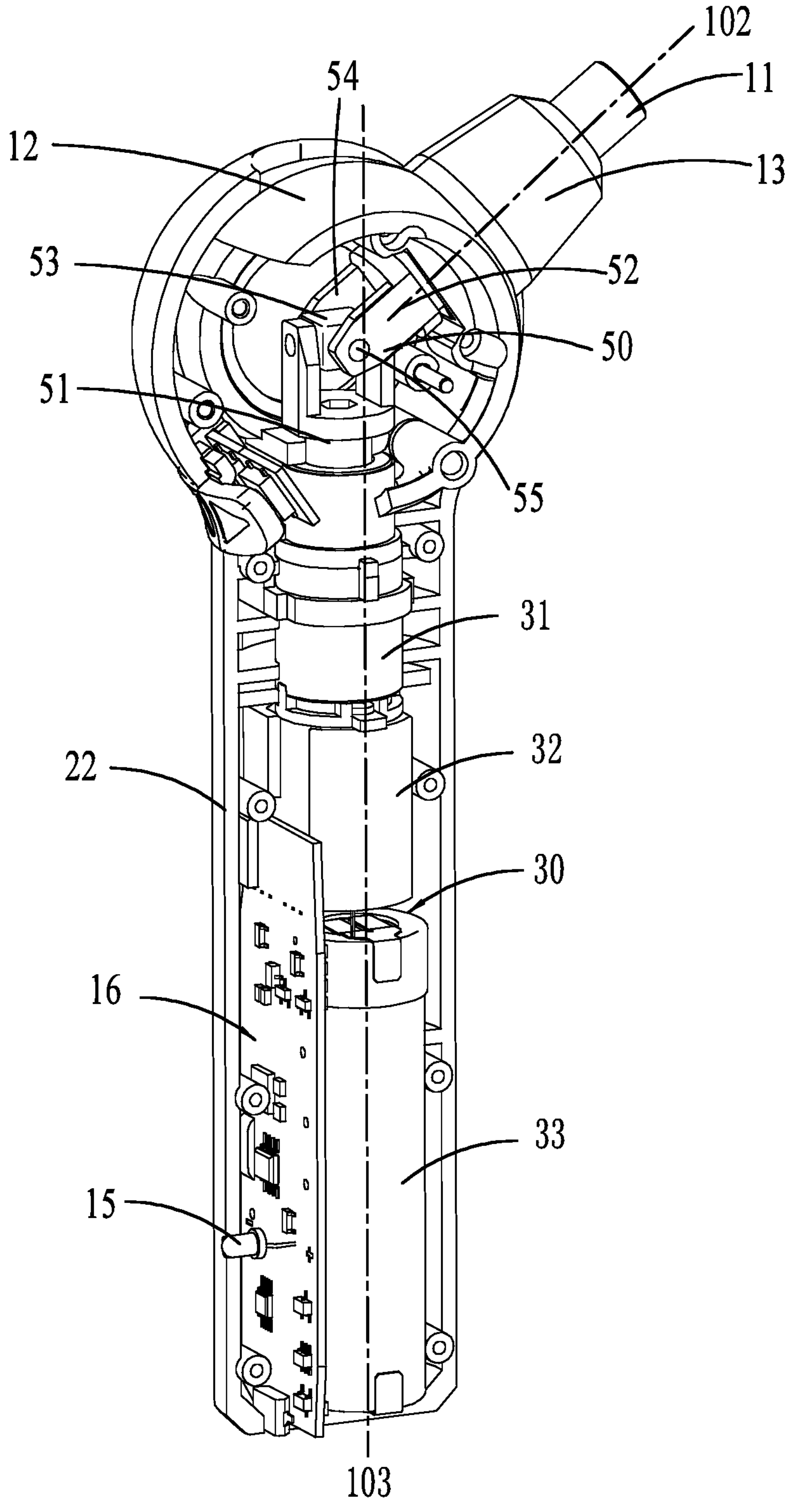
FIG. 3 is a schematic view of the internal structure of the present application.
Figure 4:
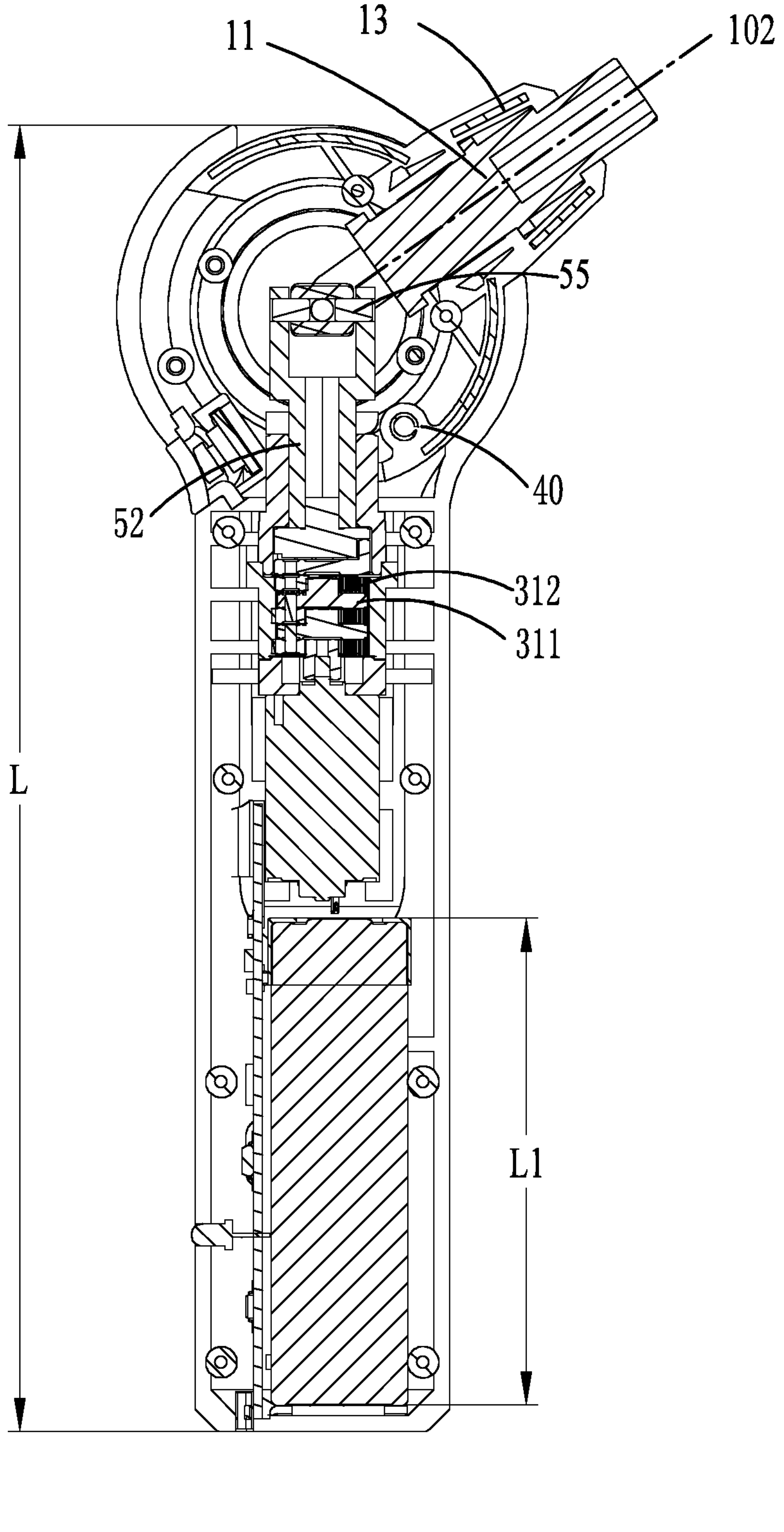
FIG. 4 is a sectional view of the present application.

As shown in FIGS. 3 and 4, the drive mechanism 30 is disposed in the main housing 20 along the third axis 103. In this example, the drive mechanism 30 is disposed in the second accommodation space, or at least most of the drive mechanism 30 is disposed in the second accommodation space. The drive mechanism 30 includes a power supply assembly 33, an electric motor 32, and a transmission assembly 31. The transmission assembly 31, the electric motor 32, and the power supply assembly 33 are sequentially connected from top to bottom.

In this example, the power supply assembly 33 is an internal battery pack accommodated at the bottom of the grip 22. To increase the amount of power stored in the power supply assembly 33 to prolong the service life thereof, the power supply assembly 33 increases the width of the grip 22 at the corresponding position. A charging port may be disposed at an end of the main housing 20, and the power supply assembly 33 is electrically connected to a charger socket located at the lower end of the grip 22. In some examples, the power supply assembly 33 is a rechargeable battery removable from the grip 22. The power supply assembly 33 may be mains, an alternating current power supply, or a hybrid of mains and a battery pack and implements power supply in conjunction with corresponding rectifying, filtering, and voltage regulating circuits.

The electric motor 32 is electrically connected to the power supply assembly 33, and the power supply assembly 33 supplies output power to the electric motor 32. In this example, the nominal voltage of the power supply assembly 33 is less than or equal to 10 V. In some examples, the nominal voltage is less than or equal to 6 V. In this example, for example, a handheld electric screwdriver has a nominal voltage of 4 V to 5 V, and the power supply assembly 33 is a battery. In some examples, the power supply assembly 33 may be a universal detachable replaceable battery or a universal detachable rechargeable battery.

The length L1 of the power supply assembly 33 is greater than or equal to 30 mm and less than or equal to 50 mm. It is to be noted that the length of each assembly of the drive mechanism 30 refers to the length of each assembly of the drive mechanism 30 in the direction of the third axis 103.

The power tool 1 has an overall length L, and the overall length L refers to the length of the main housing 20. The overall length L is less than or equal to 200 mm. In some examples, the overall length L of the power tool 1 is less than or equal to 190 mm. In some examples, the overall length L of the power tool 1 is less than or equal to 180 mm. The ratio of the length L1 of the power supply assembly 33 to the overall length L is greater than or equal to 0.15 and less than or equal to 0.3.

The transmission assembly 31 is configured to transmit power outputted by the electric motor 32 to the output shaft 11. The transmission assembly 31 is disposed between the output shaft 11 and the electric motor 32, and the transmission assembly 31 is at least partially or entirely disposed in the grip 22 and may be at least partially disposed in the connection portion 21. In this example, the transmission assembly 31 is decelerated by a planet gear. The transmission assembly 31 includes a planet gearset 311 and a gearbox housing 312. The planet gearset 311 includes a planet gear of one stage or planet gears of two stages, three stages, or more stages. An internal tooth structure is disposed on the inner side of the gearbox housing 312. Since deceleration and torque increase produced by the transmission assembly and the working principle of planet gear deceleration have been fully disclosed to those skilled in the art, a detailed description is omitted herein for the brevity of the description.

In some examples, the length of the power supply assembly 33 is less than the length of the transmission assembly 31.

As shown in FIGS. 3 to 6, the power tool 1 further includes a connection assembly 50. The connection assembly 50 is connected to the transmission assembly 31 and the output shaft 11. The connection assembly 50 is configured to transmit a rotation about the third axis 103 to the output shaft 11 so that the output shaft 11 rotates about the second axis 102. The second axis 102 and the third axis 103 may coincide with each other. After the output shaft 11 rotates about the first axis 101, the second axis 102 and the third axis 103 form an included angle, and the included angle is the angle $\alpha$ of the arc over which the working head rotates.

In this example, the connection assembly 50 includes a first connector 51, a second connector 52, and an intermediate member 53. One end of the first connector 51 is connected to the transmission assembly 31, and the first connector 51 is driven by the drive mechanism 30 to rotate. One end of the second connector 52 is connected to the output shaft 11, and the other end of the second connector 52 is connected to the intermediate member 53. The intermediate member 53 moves relative to the first connector 51 and the second connector 52 to transmit power outputted by the drive mechanism 30 to the output shaft 11. The first connector 51 and the second connector 52 have similar structures, and one of the first connector 51 and the second connector 52 is described below. Protruding connection arms 54 are disposed at an end of the first connector 51 and an end of the second connector 52, where each of the connection arms 54 includes two connection arm units disposed on two sides of the intermediate member 53, and the connection arms 54 are connected to the intermediate member 53 by rotating shafts 55. The first connector 51 and the second connector 52 are rotatable relative to the intermediate member about their respective rotating shafts 55. Two rotating shafts 55 are perpendicular to each other. For example, the intermediate member 53 may be a cube or a sphere, which saves more space.

The first connector 51, the intermediate member 53, and the second connector 52 constitute a universal joint mechanism.

The intermediate member 53 is configured to display the logo or special appearance of a product or a product shape, or the intermediate member 53 may be configured to display product information. For example, the intermediate member 53 indicates the rotation angle of the output shaft 11 about the first axis 101 or the rotational speed of the output shaft 11. In some examples, a state display unit is disposed on the intermediate member 53. The display unit includes a liquid crystal display (LCD)/light-emitting diode (LED) display, a buzzer, a component like a light-emitting diode, or another component with a prompt function, and the display unit is configured to display or prompt a state when the power tool has an abnormal working state or a low state of charge. A prompt mode varies with a product definition and requirement. It is to be understood that the prompt mode has been fully disclosed to those skilled in the art.

The main housing 20 is provided with a window portion 14, and the window portion 14 is configured to display an internal structure of the power tool 1. In this example, the window portion 14 includes a window slot 212 formed on the main housing 20 and a cover 141 disposed on the window slot 212. The cover 141 is made of a transparent or translucent material so that a user can observe the internal structure of the power tool 1. In this example, the window portion 14 is disposed on the connection portion 21, and the window portion 14 is opposite to the connection assembly 50 in position so that part of the structure of the connection assembly 50 is displayed in the window portion. The window portion 14 is opposite to the intermediate member 53 in position so that the intermediate member 53 is displayed in the window portion, and the display or indication function described above has been fulfilled. Since the output shaft housing 13 extends to the position of the connection assembly 50, a portion of the output shaft housing 13 corresponding to the window portion 14 is provided with a first through hole 131. The diameter of the first through hole 131 is larger than the diameter of the window slot 212.

In other alternative examples, the window portion and the main housing 20 are an integrally formed structure, where the transparent or translucent window portion and the main housing 20 form an integrated structure, that is, a non-detachable structure, through insert molding or the like. In some examples, to facilitate manufacturing and increase a gorgeous effect, the whole main housing is configured to be a window portion, that is to say, the whole main housing forms a transparent or translucent structure.

The internal structure can be seen through the window portion 14, and the window portion 14 plays the role of displaying the internal structure. A lamp cover on existing tools is not for display, so it cannot be considered as a window power. That is to say, no light source is provided in the window portion 14.

In this example, the cover 141 includes a protruding central portion 1411 and a recessed peripheral portion 1412, that is, a height difference exists between the central portion 1411 and the peripheral portion 1412 so that the central portion 1411 and the peripheral portion 1412 are not in the same plane. The peripheral portion 1412 is disposed in the window slot 212, and the central portion 1411 is engaged with the window slot 212 and extends out of the window slot 212 to seal the main housing 20.

In other examples, the window portion 14 is an opening including no cover. In other examples, a display unit is disposed on the cover 141 of the window portion 14 and includes an LCD/LED display.

On the other hand, the window portion with the detachable cover is provided so that it is convenient to replace a damaged connection assembly 50.

In other examples, the window portion 14 is disposed on the working head 10. In this case, a housing similar to the connection portion 21 is formed on the working head 10, or the moving portion of the working head 10 is a housing similar to the connection portion 21.

As shown in FIGS. 1 to 3, the power tool 1 further includes an operation member and a controller. The operation member includes a main switch 171 and a switching operation member. The main switch 171 is configured to control the start and stop of the electric motor 32. The switching operation member is configured to switch a forward rotation state and a reverse rotation state of the electric motor 32. The main switch 171 is disposed at the joint of the grip 22 and the connection portion 21. In this example, the main switch 171 is disposed on a side adjacent to the window portion 14. In this example, the switching operation member is combined with the main switch. The main switch 171 and the switching operation member are disposed on a side opposite to the rotation slot 211. That is to say, when operated, the main switch 171 and the switching operation member are operated by the thumb of an operator most of the time. It is convenient to operate the switch during use.

The controller is disposed on a control circuit board 16. The control circuit board 16 includes a printed circuit board (PCB) and a flexible printed circuit board (FPC). A dedicated control chip is used as the controller, for example, a single-chip microcomputer or a microcontroller unit (MCU).

The operation member is connected to a corresponding switch. The switch is electrically connected to the controller. According to different signals sent by the switch, the controller performs corresponding control actions on the electric motor.

Figure 5:
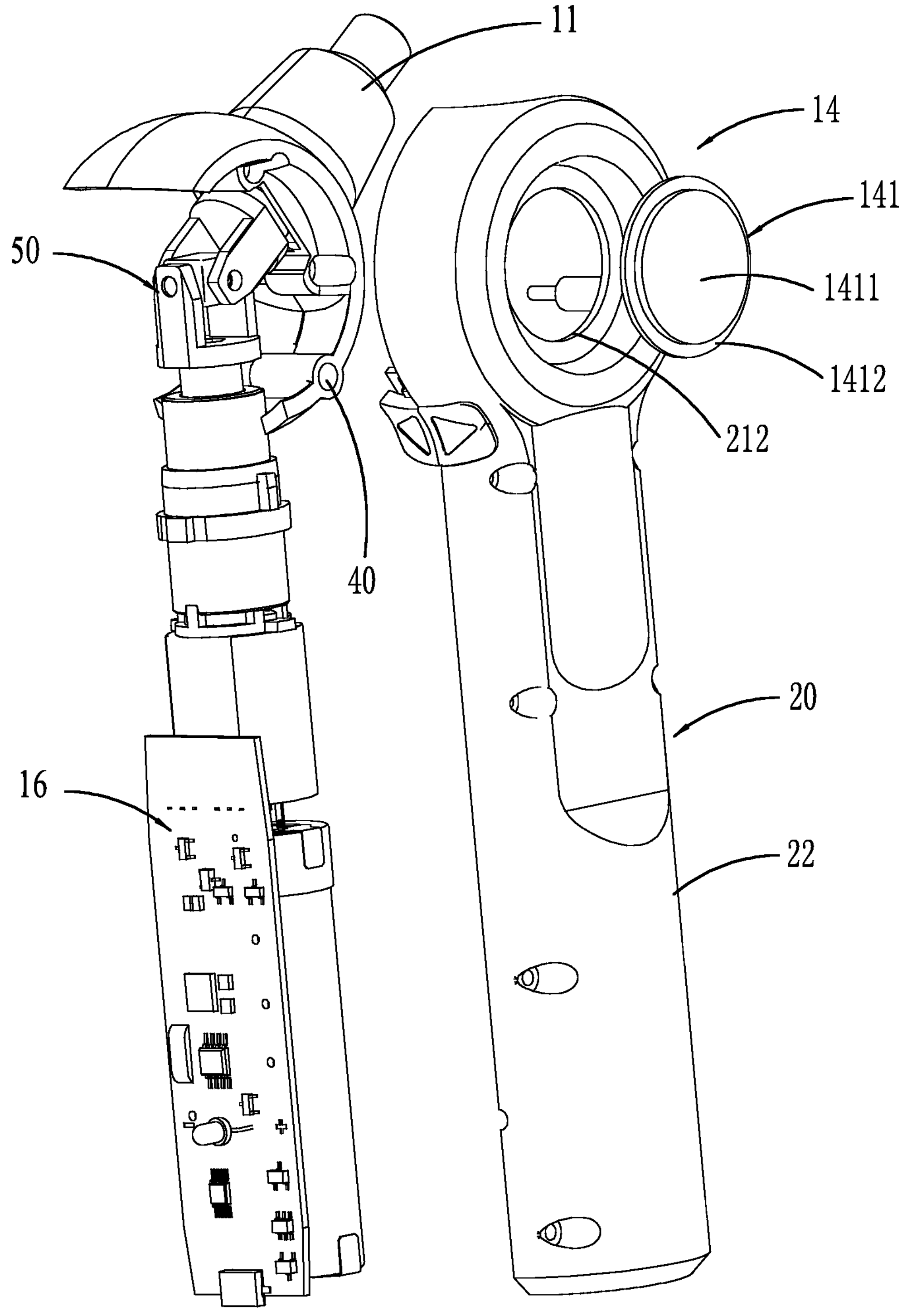
FIG. 5 is an exploded view of the internal structure of the present application.
Figure 6:
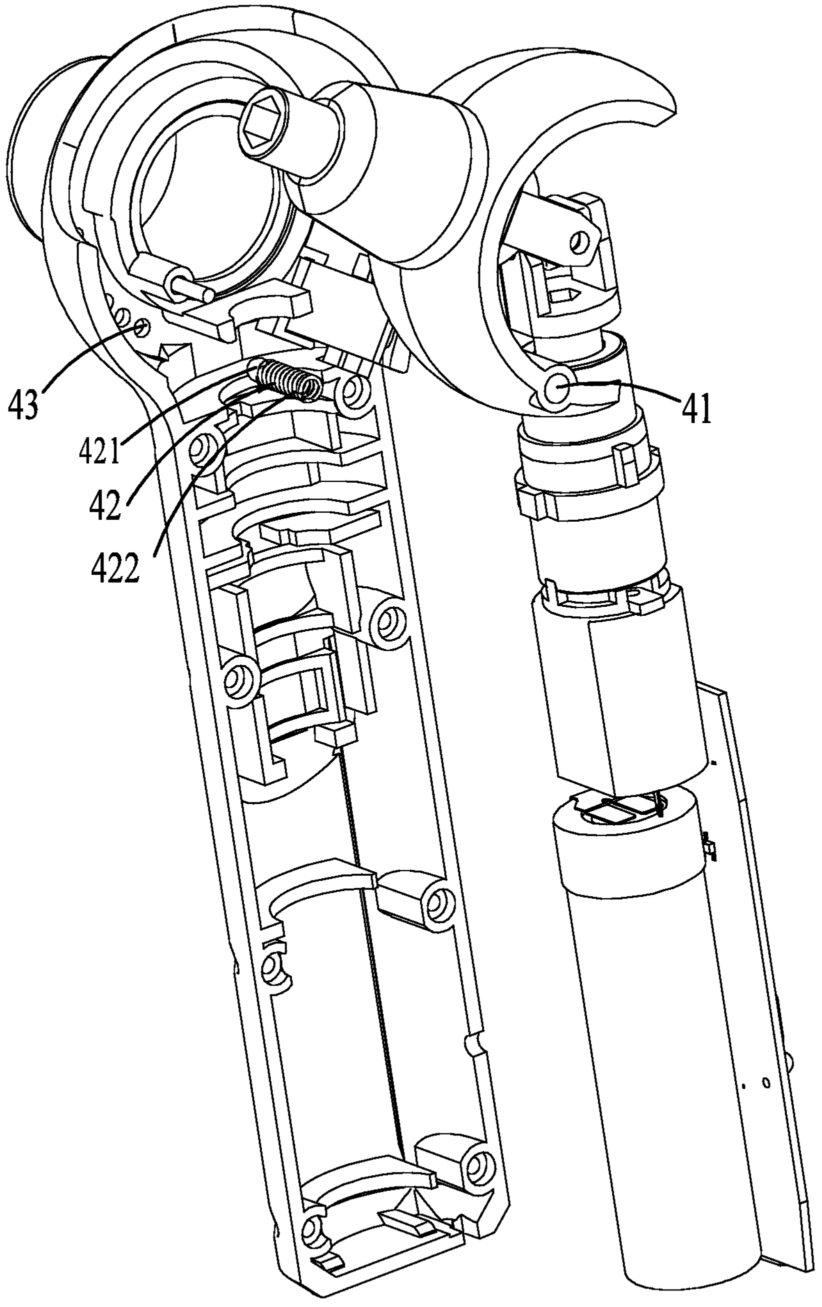
FIG. 6 is an exploded view of the internal structure of the present application from another angle of view.

As shown in FIGS. 4 to 6, the power tool 1 further includes a positioning assembly 40 configured to position a rotational position of the tool head 10 relative to the main housing 20 about the first axis 101. The positioning assembly 40 is disposed between the moving portion 12 and the connection portion 21 and couples the moving portion 12 to the connection portion 21 to stop the tool head 10 at a set position.

The positioning assembly 40 includes a base 41, a positioning pin 42, and a positioning slot 43. Multiple positioning slots 43 are provided. The multiple positioning slots 43 are disposed on the inner side of the connection portion 21. In this example, multiple angle indicators are disposed on the outer side of the connection portion 21, that is, a side observable by the user. The number of angle indicators is the same as the number of positioning slots 43. The base 41 is disposed on the tool head 10. In this example, the base 41 is disposed on the moving portion 12. The base 41 extends along the direction of the first axis 101. The positioning pin 42 connects the moving portion 12 to the connection portion 21. One end of the positioning pin 42 is connected to the base 41, and the other end of the positioning pin 42 is clutchably connected to the positioning slot 43. The positioning pin 42 is movable in the base 41 and relative to the moving portion 12. The movement of the positioning pin 42 is caused by the rotation of the tool head 10 about the first axis 101, and several positioning slots 43 correspond to the positioning pin 42 in shape. The positioning slot 43 is connected to the positioning pin 42 to position the tool head 10. The position of each positioning slot 43 corresponds to a different rotation angle of the tool head 10.

When the tool head 10 rotates from one angle to another, the positioning pin 42 moves from a corresponding positioning slot 43 into the base 41 and then moves from the base 41 to another positioning slot 43. In this example, the positioning pin 42 includes a ball 421 and a telescopic member 422. When the tool head 10 is rotated, the ball 421 moves in a slot adjacent to the positioning slot 43 to a slot wall to be pressed by the slot wall, and the ball 421 biases the telescopic member 422. When the ball 421 enters the positioning slot 43, the telescopic member 422 supports the ball 421 to keep the ball 421 in the positioning slot 43.

The power tool 1 further includes an illumination assembly 15. The illumination assembly 15 is disposed on the control circuit board 16. The control circuit board 16 is electrically connected to the drive mechanism 30. The control circuit board 16 is disposed in the grip 22 and is parallel or substantially parallel to the drive mechanism 30 or the third axis 103. Being substantially parallel refers to the case where the included angle between the control circuit board 16 and the drive mechanism 30 or the third axis 103 is less than or equal to 10°.

Figure 7:
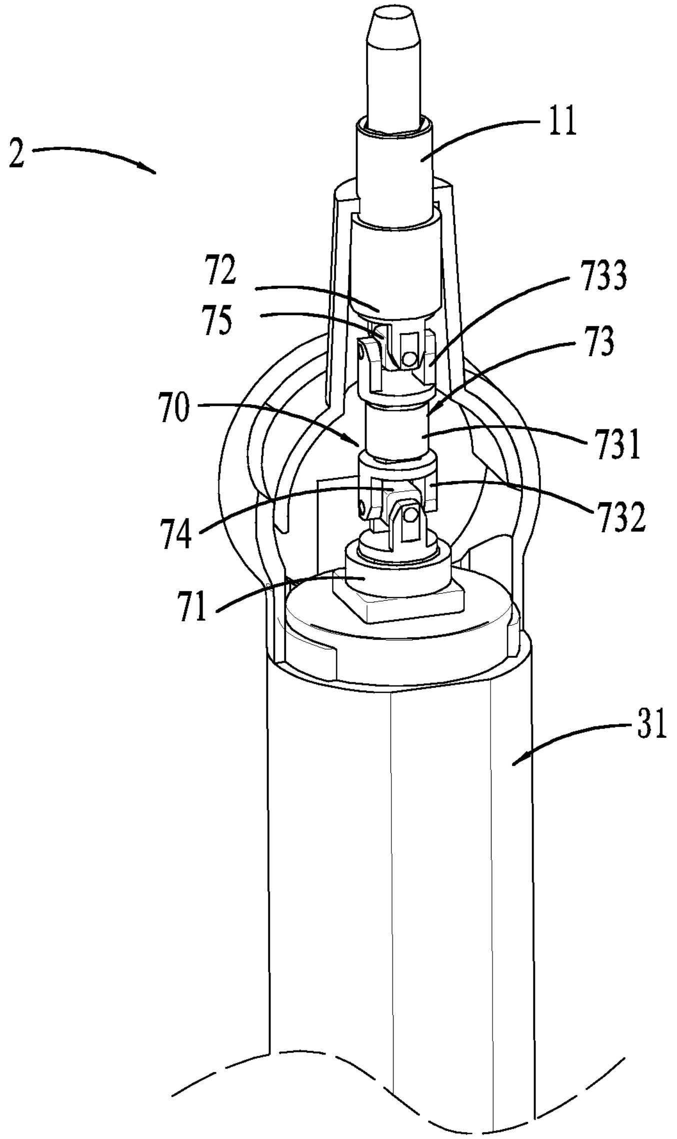
FIG. 7 is a partial schematic view of another example of the present application.

In another example of the present application, as shown in FIG. 7, a power tool 2 different from the preceding power tool is further provided. Only differences between the power tool 2 and the preceding power tool are described below, and the same reference numerals are used for the same components.

In this example, the power tool 2 includes a connection assembly 70, and the connection assembly 70 includes a first connector 71, a second connector 72, and a third connector 73. One end of the first connector 71 is connected to the transmission assembly 31, and the first connector 71 is driven by the drive mechanism 30 to rotate. The other end of the first connector 71 is connected to the third connector 73. One end of the second connector 72 is connected to the output shaft 11, and the other end of the second connector 72 is connected to the third connector 73. Protruding connection arms are disposed at an end of the first connector 71 and an end of the second connector 72, and the other end of the first connector 71 and the other end of the second connector 72 are tubular or cylindrical. A protruding first connection arm 732 and a protruding second connection arm 733 are disposed at two ends of the third connector 73 separately. A first intermediate member 74 and a second intermediate member 75 are disposed between the first connector 71 and the third connector 73 and between the second connector 72 and the third connector 73, respectively.

The third connector 73 is configured to display a product shape, or the third connector 73 may be configured to display product information. For example, the third connector 73 indicates the rotation angle of the output shaft 11 about the first axis 101 or the rotational speed of the output shaft 11. The third connector 73 further includes a direction-changing support 731 connecting a first claw portion 732 to a second claw portion 733 and enabling the relative movement between the first claw portion 732 and the second claw portion 733. In this example, the first connector 71, the first intermediate member 74, and the first claw portion 732 constitute a first universal joint mechanism. The second connector 72, the second intermediate member 75, and the second claw portion 733 constitute a second universal joint mechanism. A fourth connector is disposed in the direction-changing support 731. The fourth connector connects the first universal joint mechanism to the second universal joint mechanism. In this case, the first universal joint mechanism and the second universal joint mechanism move relative to each other.

The exterior of the direction-changing support 731 is configured to display the logo or special appearance of a product, or the exterior of the direction-changing support 731 may be configured to display product information. For example, the exterior of the direction-changing support 731 indicates the rotation angle of the output shaft 11 about the first axis 101 or the rotational speed of the output shaft 11. In some examples, a state display unit is disposed on the exterior of the direction-changing support 731. The display unit includes an LCD/LED display, a buzzer, a component like a light-emitting diode, or another component with a prompt function, and the display unit is configured to display or prompt a state when the power tool has an abnormal working state or a low state of charge. A prompt mode varies with a product definition and requirement. It is to be understood that the prompt mode has been fully disclosed to those skilled in the art.

The third connector 73 is detachably connected to the first connector 71 and the second connector 72, and the third connector 73 is detachable and replaceable. Multiple universal joint mechanisms are used for transmission, which can increase the range of a without reducing the speed transmitted to the output shaft.

Figure 8:
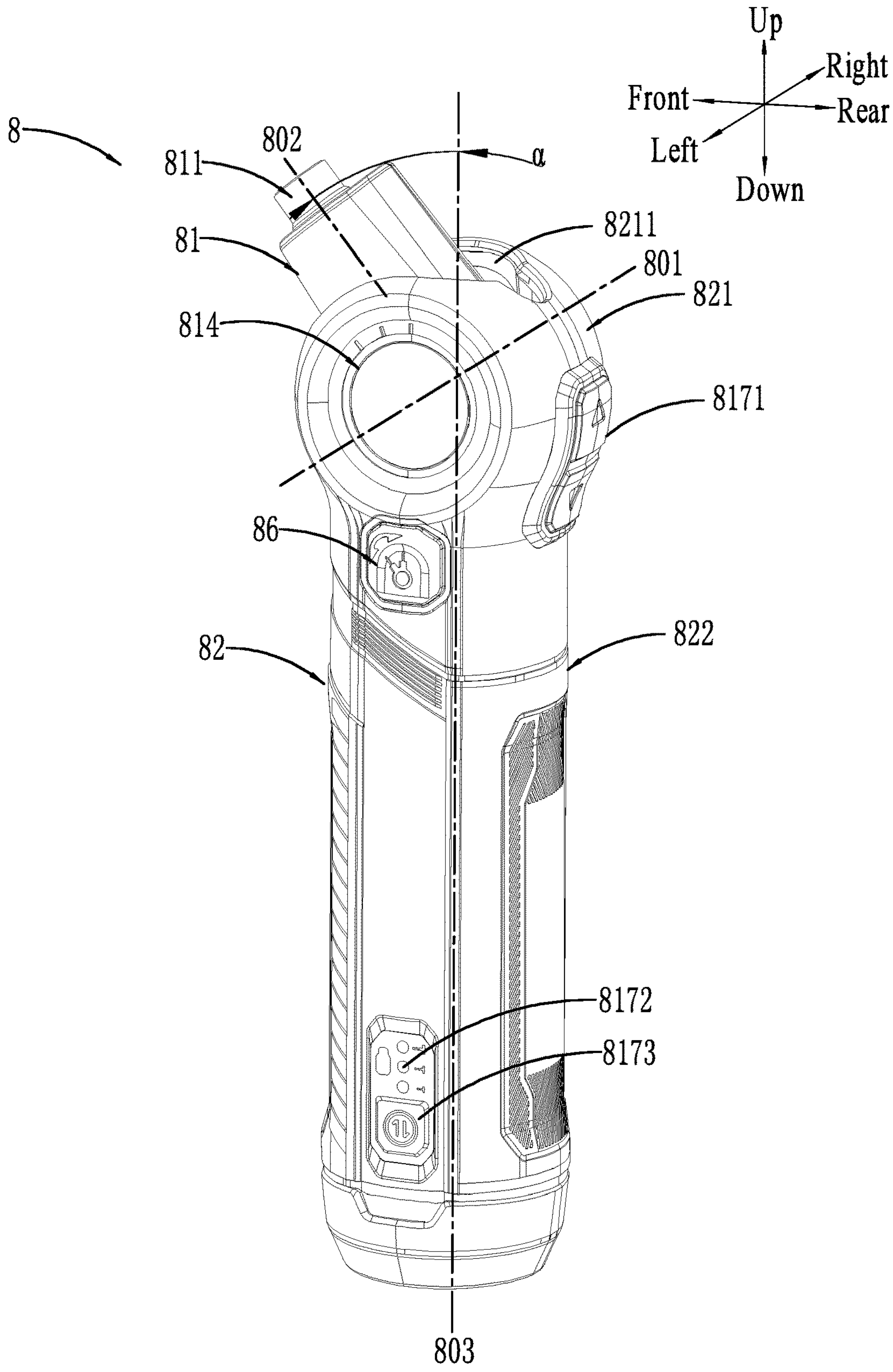
FIG. 8 is a perspective view of an example of the present application, where a working head is at a limit position.

To describe technical solutions of the present application clearly, "upper side", "lower side", "left side", "right side", "front side", and "rear side" as shown in FIG. 8 are further defined.

As shown in FIGS. 8 to 11, a power tool 8 includes a working head 81, a main housing 82, and a drive mechanism 83. The working head 81 may output power directly or may be connected to another work accessory to output power. According to the working mode or output power of the working head 81, the power tool 8 may be a corresponding tool, such as a screwdriver, a drill, or a wrench. The working head 81 is connected to the main housing 82 and rotates about a first axis 801 relative to the main housing 82 under the action of an external force. The working head 81 is connected to the drive mechanism 83 and outputs power under the action of the drive mechanism 83.

The working head 81 includes an output shaft 811. The output shaft 811 is driven by the drive mechanism 83 to rotate about an output axis 802. In this example, the screwdriver is used as an example, and a mounting groove 8111 to which different bits are mounted is further formed at the end of the output shaft 811. For example, the mounting groove 8111 is a standard hexagonal groove. In other alternative examples, for example, the power tool is the wrench, and a mounting head for mounting a sleeve is formed at or connected to the end of the output shaft 811. In other alternative examples, for example, the power tool is the drill, and a collet assembly for holding a drill bit is connected to the end of the output shaft 811.

The main housing 82 includes a grip 822 and a connecting portion 821, where the connecting portion 821 is formed at or connected to an end of the grip 822, and the connecting portion 821 is used for connecting the working head 81. In this example, the main housing 82 extends along a third axis 803 as a whole. The connecting portion 821 is located at the upper end of the main housing, that is to say, the working head 81 is connected to the upper end of the main housing 82. The connecting portion 821 is formed with a first accommodation space. The grip 822 is disposed below the connecting portion. The grip 822 is formed with a second accommodation space, and the first accommodation space communicates with the second accommodation space. Most of the drive mechanism 83 is disposed in the second accommodation space formed by the grip 822. It is to be understood that the main housing 82 is substantially in the shape of a straight tube.

Figure 11:
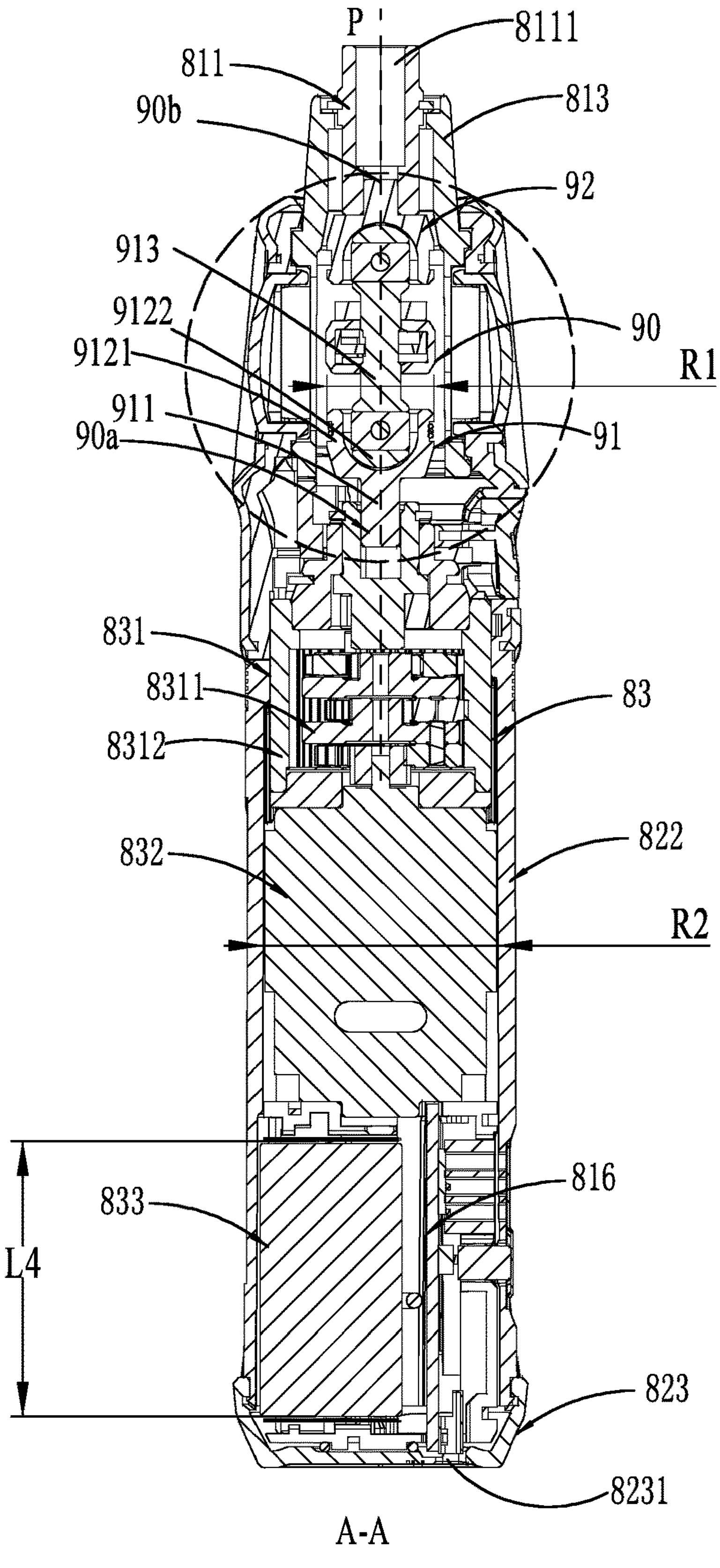
FIG. 11 is a sectional view of a power tool taken along line A-A of FIG. 10.
Figure 12:
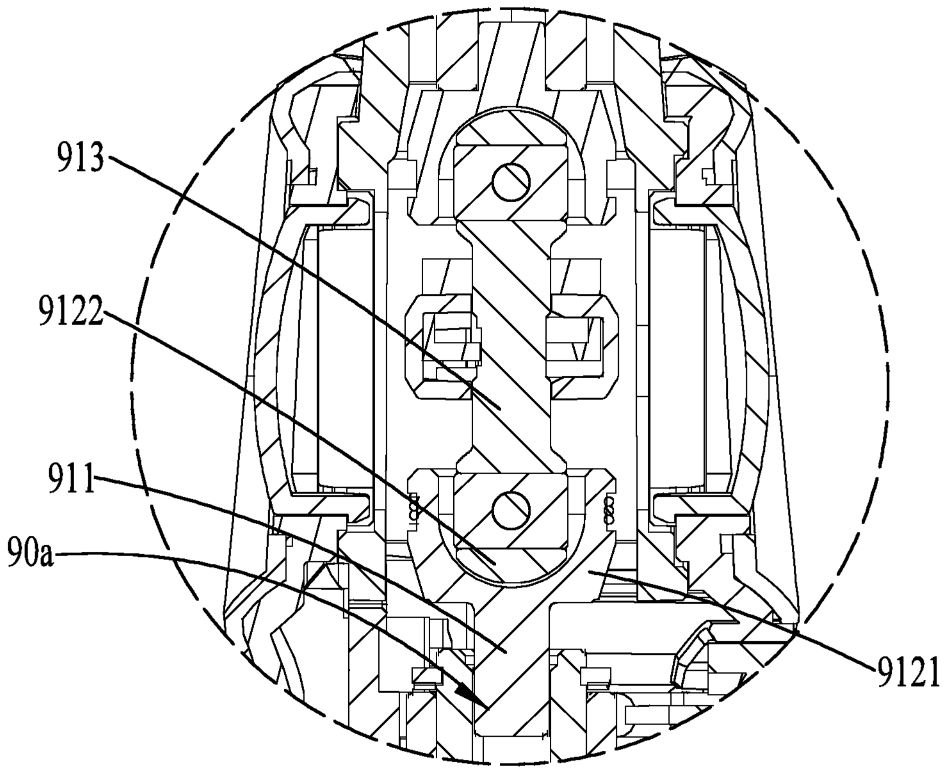
FIG. 12 is an enlarged view of a part structure in FIG. 11.
Figure 13:
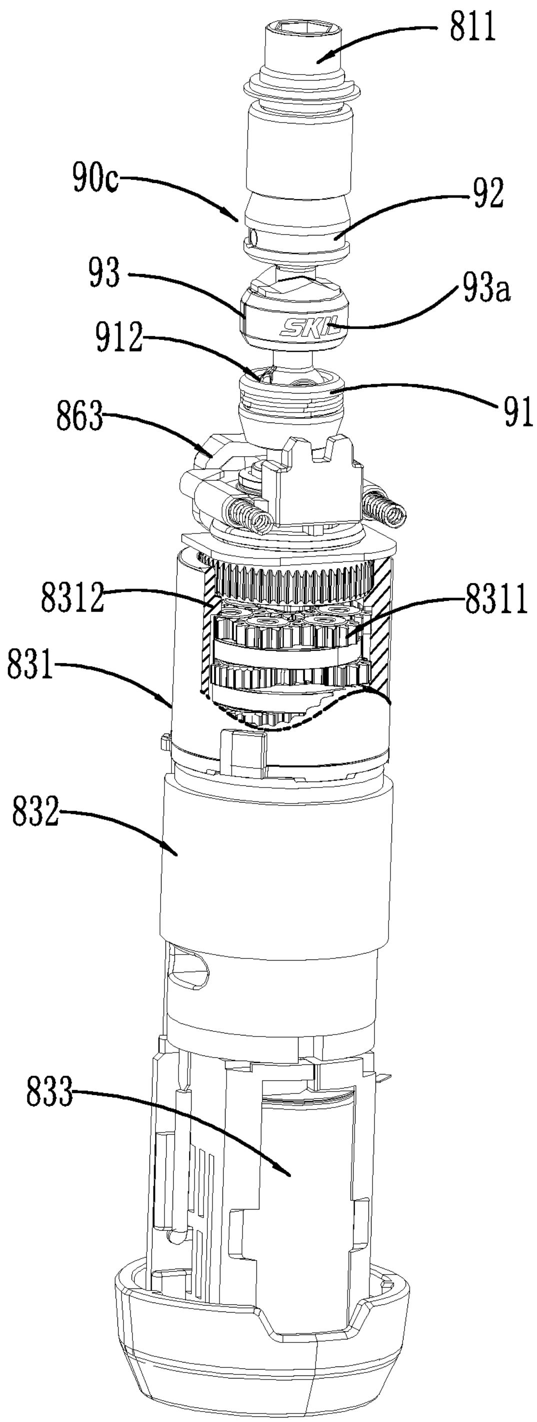
FIG. 13 is a schematic view of the internal structure of a power tool in FIG. 9 and a partial sectional view of a gearbox housing.

As shown in FIGS. 11 to 13, the drive mechanism 83 includes a motor 832 and a direct current power supply 833. In this example, the motor 832 includes a drive shaft rotatable about a drive axis. In this example, the drive axis coincides with the third axis 803. In other alternative examples, the drive axis and the third axis 803 are parallel to each other but do not coincide. In other alternative examples, a certain included angle exists between the drive axis and the third axis 803. In this example, the motor 832 is specifically an electric motor, and the electric motor 832 is used below instead of the motor in the subsequent description, but it does not serve as a limitation of the present invention.

In this example, the direct current power supply 833 is specifically a battery or a battery pack. The battery or the battery pack mates with a corresponding power circuit to supply power to the power tool 8. Those skilled in the art should understand that the battery is a built-in rechargeable battery or a replaceable standard battery. The direct current power supply 833 may also be the battery pack. In some examples, the direct current power supply 833 includes one battery. In some examples, the direct current power supply includes multiple batteries. It is to be understood that the number of cells in each battery varies with the nominal voltage and capacity of the battery, which does not limit the substantive content of the present application. In this example, the direct current power supply 833 has a nominal voltage less than or equal to 7.2 V. In this example, the direct current power supply has a nominal voltage less than or equal to 5 V.

In this example, the diameter of the grip is basically the same. In some examples, to increase the amount of power stored in the direct current power supply 833 to prolong the service life thereof, the width of the grip 822 at the corresponding position of the direct current power supply 833 increases.

A charging interface 8231 may be provided near the end of the main housing 82, such as one or more of a universal serial bus (USB) interface, a Type-C interface, and a lighting interface. In this example, the charging interface 8231 is disposed at the bottom. The direct current power supply 833 is electrically connected to the charging interface 8231. In some examples, the direct current power supply 833 is the rechargeable battery removable from the grip 822. The power tool is not limited to only using the direct current power supply 833 for power supply. With the corresponding rectification, filtering, and voltage regulation circuits, the power tool can be powered by not only the direct current power supply but also the alternating current power.

As shown in FIGS. 8 to 10 and FIGS. 14 and 15, the working head 81 further includes a moving portion 812 and an output shaft housing 813. The moving portion 812 is formed on or connected to the output shaft housing 813. The output shaft housing 813 is wrapped around the outer circumference of the output shaft 811. When the output shaft 811 rotates about the output axis 802, the output shaft housing 813 basically does not rotate with the output shaft 811.

The moving portion 812 is connected to the main housing 82. In this example, the moving portion 812 is movably connected to the connecting portion 821 or is disposed in the first accommodation space. When the working head 81 rotates about the first axis 801 relative to the main housing 82, the moving portion 812 rotates with the working head 81 about the first axis 801. The connecting portion 821 on the main housing 82 is provided with a rotation groove 8211, the output shaft 811 protrudes from the rotation groove 8211, and the moving portion 812 is limited in the rotation groove 8211. The connecting portion 821 includes an arc-shaped or arc-like guide portion, and the working head 81 moves along the guide portion. In some examples, the rotation groove 8211 may be a closed groove body formed with a space in which the moving portion 812 is placed. In some examples, the rotation groove 8211 may be an open groove and has a limiting portion for limiting the movement of the moving portion 812. The limiting portion is provided so that the rotation groove 8211 is formed with a limiting groove with an opening in the first accommodation space. The output shaft 811 protrudes from the rotation groove 8211, and the outer diameter of an end of the output shaft 811 connected to the moving portion 812 is approximately equal to the width of the rotation groove so that the end is engaged with the rotation groove 8211. The rotation groove 8211 is disposed on a circumferential side (that is, a side around the first axis 801) of the connecting portion 821. In this example, the circumferential side of the connecting portion 821 is a curved surface, and the moving portion 812 is a curved surface having a shape corresponding to the circumferential side of the connecting portion. The surface of the moving portion 812 fits the inner surface of the connecting portion 821 so that the moving portion 812 is movable along the rotation groove 8211 on the connecting portion 821.

As shown in FIGS. 11 to 13, in this example, the power tool 8 further includes a connection assembly 90. The connection assembly 90 rotates the working head 81 about the first axis 801 relative to the main housing 82. The connection assembly 90 transmits the torque outputted by the drive mechanism 83 to the output shaft 811. The power tool 8 includes a first transmission path. The first transmission path is a torque transmission path from the drive mechanism 83 through the connection assembly 90 to the output shaft 811. In this example, after the electric motor 832 is powered on, the drive shaft of the electric motor 832 rotates to generate torque. The drive mechanism 83 transmits the torque to the output shaft 811 through the connection assembly 90. The output shaft 811 outputs torque and the torque acts on a fastener, thereby forming a torque transmission path from the drive mechanism 83 through the connection assembly 90 to the output shaft 811, that is, the first transmission path. It is to be understood that when the working head 81 rotates about the first axis 801 relative to the main housing 82, an axis P of the first transmission path changes with the rotation of the working head 81, that is, the rotation of the output shaft 811. That is, the starting point of the axis P of the first transmission path is the electric motor 832, and the end point of the axis P passes through the output shaft 811. Therefore, the axis P of the first transmission path is a curve or a straight line from the electric motor 832 through the connection assembly 90 to the output shaft 811. The direction of the first transmission path is from the starting point to the end point of the axis P of the first transmission path.

The connection assembly 90 includes an input portion 90*a* connected to the drive mechanism 83 and an output portion 90*b* connected to the output shaft 811. The input portion 90*a* and the output portion 90*b* are two independent components connected to each other or different parts of the same component. When the working head 81 rotates about the first axis 801 relative to the main housing 82, the components in the first transmission path are allowed to deform or to be displaced along the direction of the first transmission path. That is to say, the component group in the first transmission path includes at least one component that is or includes a flexible structure, or at least two components in the component group in the first transmission path are in a floating connection. In this manner, when the working head 81 rotates about the first axis 801, the axis P of the first transmission path may bend or change in angle, thereby releasing the axial limit of the components in the first transmission path. In this example, the input portion 90*a* and the output portion 90*b* are independent components connected to each other. When the working head 81 rotates about the first axis 801 relative to the main housing 82, at least one of the drive mechanism 83, the input portion 90*a*, the output portion 90*b*, and the output shaft 811 is allowed to be displaced along the direction of the first transmission path. In some examples, the input portion 90*a* and the output portion 90*b* are different parts of the same component, for example, this component may be a flexible cable or a flexible shaft. When the working head 81 rotates about the first axis 801 relative to the main housing 82, the connection assembly 90 is allowed to deform.

As an example of the present application, the connection assembly 90 includes a universal joint 90*c*. In this example, the universal joint 90*c* includes a first universal joint 91 and a second universal joint 92 connected to each other, that is, the universal joint 90*c* may be a duplex universal joint. The first universal joint 91 may provide at least two orthogonal rotational degrees of freedom. The second universal joint 92 may provide at least two orthogonal rotational degrees of freedom.

The first universal joint 91 is used as an example for the description of the specific structure. The first universal joint 91 includes a first input portion 911, a first output portion 913, and a first holding portion 912. The first holding portion 912 connects the first input portion 911 to the first output portion 913. In this example, the first holding portion 912 is a spherical retaining frame composed of a spherical base 9121 and a corresponding ball head 9122. Any one of the first input portion 911 and the first output portion 913 forms or is connected to the spherical base 9121, and the other one of the first input portion 911 and the first output portion 913 forms or is connected to the ball head 9122. In this example, the drive mechanism 83 is connected to an end of the first input portion 911, and the spherical base 9121 is formed at the other end of the first input portion 911. The ball head 9122 is formed at an end of the first output portion 913, and the second universal joint 92 is connected to the other end of the first output portion 913. Rolling balls are disposed in the ball head 9122 to keep the ball head 9122 in the spherical base 9121 and enable the first universal joint 91 to achieve variable-angle power transmission. The dimension of part of the first input portion 911, the first output portion 913, and the first holding portion 912 with the largest radial dimension is defined as the maximum radial dimension R1 of the first universal joint 91. In this example, the diameter of the spherical base 9121 is the maximum radial dimension R1 of the first universal joint 91. The ratio of the maximum radial dimension R1 of the first universal joint 91 to the outer diameter dimension R2 of the electric motor 832 is greater than or equal to 0.1 and less than or equal to 0.9. It is to be explained that when the electric motor 832 is an inrunner motor, the outer diameter of the electric motor 832 is the diameter of stator laminations. When the electric motor 832 is an outrunner motor, the outer diameter of the electric motor 832 is the diameter of a rotor sleeve. In some examples, the ratio of the maximum radial dimension R1 of the first universal joint 91 to the outer diameter dimension R2 of the electric motor 832 is greater than or equal to 0.1 and less than or equal to 0.7. In some examples, the ratio of the maximum radial dimension R1 of the first universal joint 91 to the outer diameter dimension R2 of the electric motor 832 is greater than or equal to 0.1 and less than or equal to 0.6. In some examples, the ratio of the maximum radial dimension R1 of the first universal joint 91 to the outer diameter dimension R2 of the electric motor 832 is greater than or equal to 0.2 and less than or equal to 0.9.

In this example, the ball head 9122 forms a floating connection with the spherical base 9121. When the working head 81 rotates around the first axis 801 relative to the main housing 82, the ball head 9122 floats relative to the spherical base 9121, that is to say, there is a gap between the ball head 9122 and the spherical base 9121 so that the ball head 9122 can move relative to the spherical base 9121 in the direction of the first transmission path. The ball head 9122 can be understood as a part in the first transmission path that can be displaced along the direction of the first transmission path.

As can be seen from the related art, the outer diameter of the electric motor affects the performance of the electric motor. In the first transmission path, the connection assembly 90 needs to ensure sufficient strength so that the torque can be transmitted to the output shaft 811. In this manner, breaking or unspecified deformation of the connection assembly can be avoided during torque transmission. The increase of the diameter or volume of the connection assembly 90 improves the strength of the connection assembly, but the feel of the product are affected and the cost of the product is increased. Therefore, a relatively balanced and proper relationship is required between the connection assembly 90 and the electric motor 832. The ratio of the maximum radial dimension R1 of the first universal joint to the outer diameter dimension R2 of the electric motor 832 is defined to be greater than or equal to 0.1 and less than or equal to 0.9. In some examples, the ratio of the maximum radial dimension R1 of the first universal joint to the outer diameter dimension R2 of the electric motor 832 is defined to be greater than or equal to 0.1 and less than or equal to 0.7. In some examples, the ratio of the maximum radial dimension R1 of the first universal joint to the outer diameter dimension R2 of the electric motor 832 is defined to be greater than or equal to 0.2 and less than or equal to 0.7 so that the strength of the connection assembly 90 can be ensured during torque transmission. The overall compactness of the power tool is improved, providing a better use effect.

In some alternative examples, the number of universal joints included in the connection assembly is not limited. The number of universal joints may be one or more than two, which does not limit the substantive content of the present application.

In some alternative examples, the first universal joint 91 is a cross shaft universal joint. The first holding portion is a cross shaft part connecting the first input portion to the first output portion. The diameter of the first holding portion is the diameter of the smallest circle enclosing the cross shaft part.

In this example, the first universal joint 91 and the second universal joint 92 are spherical universal joints with the same structure. In some examples, the first universal joint and the second universal joint may have the same structure but different dimensions. In some examples, the first universal joint and the second universal joint may have different structures and different dimensions. It is to be understood that when the universal joint 90*c* includes two or more single universal joints, the maximum radial dimension R1 of the universal joint 90*c* is the maximum value among the radial dimensions of the input portion, the output portion, and the holding portion of each single universal joint in the universal joint 90*c*.

In this example, the connection assembly 90 further includes an intermediate piece 93. The intermediate piece 93 is used for displaying the logo 93*a* or special appearance of the product, a product shape, or product information. For example, the intermediate piece 93 is used for indicating the rotational angle of the working head 81 about the first axis 801 or the rotational speed of the output shaft 811. In some examples, a state display unit is disposed on the intermediate piece 93. The state display unit includes a liquid crystal display (LCD)/light-emitting diode (LED) display screen, a buzzer, a component like a light-emitting diode, or another component with a prompt function, and the state display unit is used for performing a state display or giving a prompt when the power tool has an abnormal working state or a low battery. A specific prompt mode varies with the definition and requirement of the product. It is to be understood that the specific prompt mode has been fully disclosed to those skilled in the art. It is to be understood that the intermediate piece does not belong to the components of the universal joint 90*c*, and the dimension of the intermediate piece does not belong to the dimension of the universal joint 90*c*.

Figure 9:
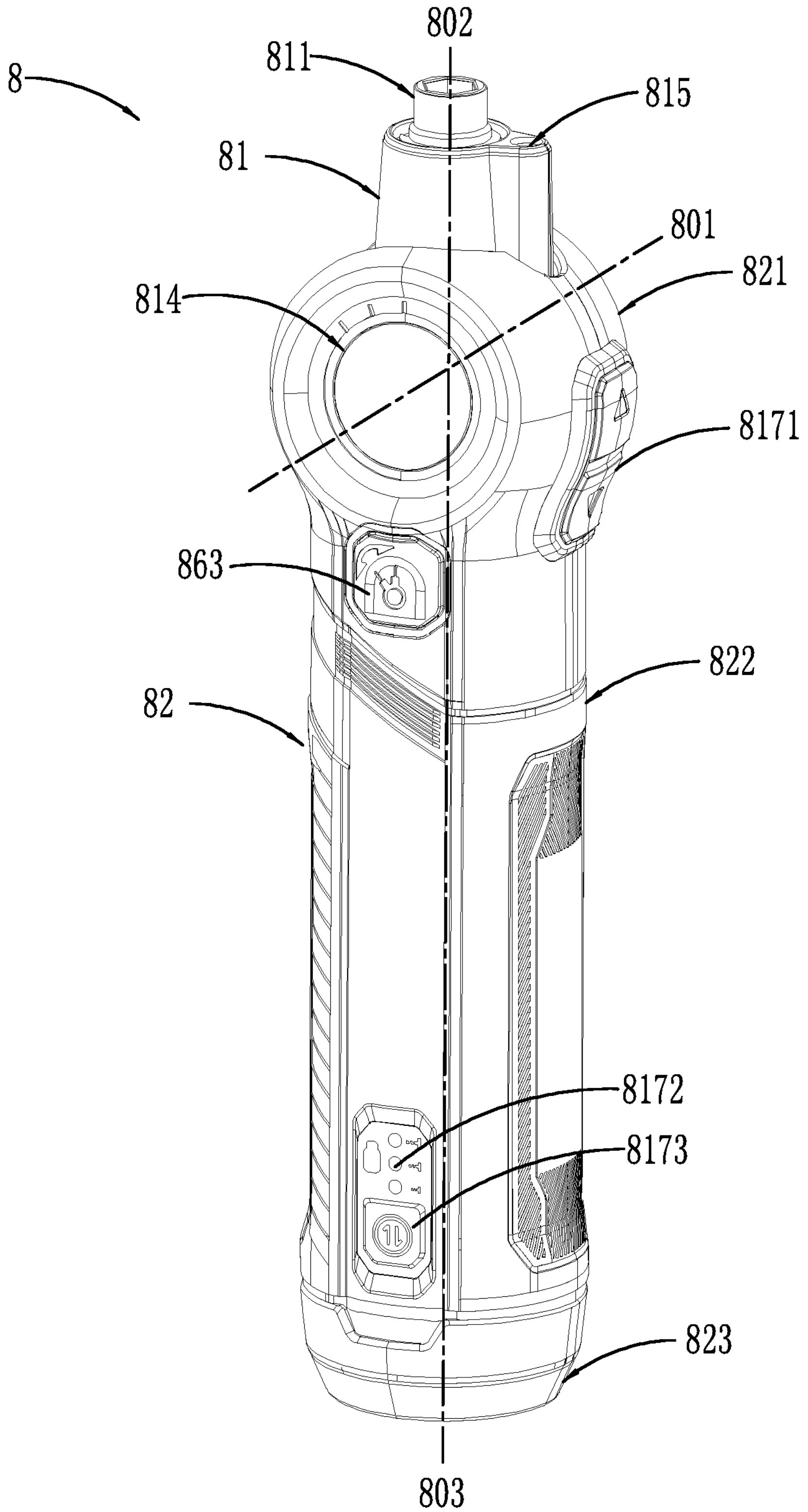
FIG. 9 is a perspective view of an example of the present application, where a working head is at a first position.
Figure 10:
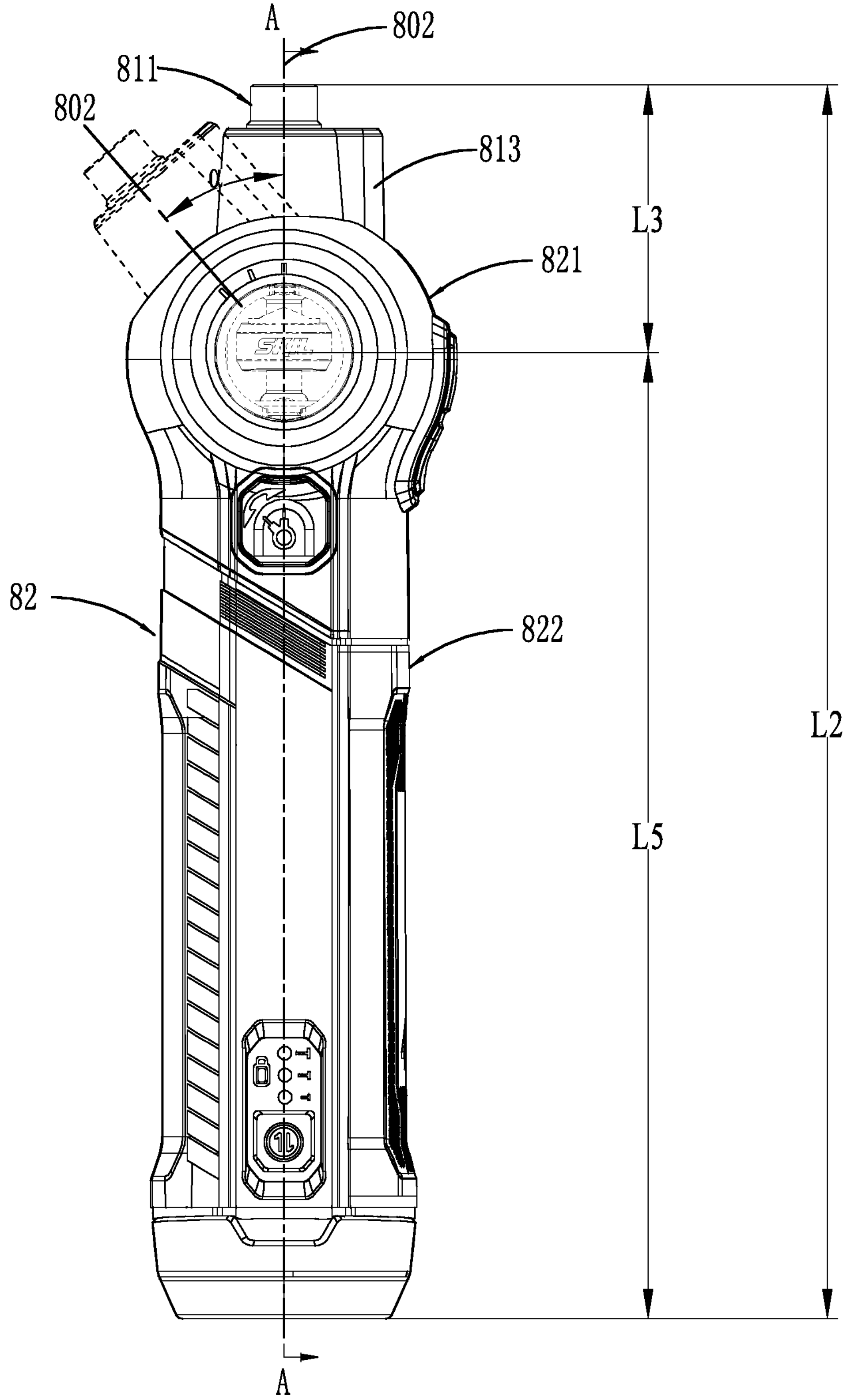
FIG. 10 is a structural view of an example of the present application, where the working head is separately at the positions shown in FIGS. 8 and 9.

As shown in FIGS. 8 to 10, the working head 81 includes a limit position and a first position. The limit position is a position for making the working head 81 move about the first axis 801 to the limit, and the first position is a position for making the axis of the input portion 90*a* parallel to or coincident with the axis of the output portion 90*b*. In this example, the axis of the input portion 90*a* coincides with the drive axis of the electric motor 832 and the third axis 803. The axis of the output portion 90*b* coincides with the output axis 802 of the output shaft 811. As shown in FIG. 9, when the working head 81 is at the first position, the third axis 803 coincides with the output axis 802. The included angle α between the axis of the input portion 90*a*, that is, the third axis 803 and the axis of the output portion 90*b*, that is, the output axis 802, is 0 degrees. As shown in FIG. 8, when the working head 81 is at the limit position, the included angle α between the axis of the input portion 90*a*, that is, the third axis 803 and the axis of the output portion 90*b*, that is, the output axis 802, is less than or equal to 85 degrees. In some examples, when the working head 81 is at the limit position, a is less than or equal to 70 degrees, 60 degrees, or 50 degrees. The included angle α between the axis of the input portion 90*a*, that is, the third axis 803 and the axis of the output portion 90*b*, that is, the output axis 802, when the working head 81 is at the limit position is limited so that the output torque of the output shaft 811 is ensured, and the torque transmission efficiency of the connection assembly is ensured. When the working head 81 is at the first position, the connection assembly 90 has the maximum torque transmission efficiency. The torque transmission efficiency of the connection assembly 90 when the working head 81 is at the limit position is lower than the torque transmission efficiency of the connection assembly 90 when the working head 81 is at the first position. In this example, at the limit position, the included angle α between the axis of the input portion 90*a*, that is, the third axis 803, and the axis of the output portion 90*b*, that is, the output axis 802, is less than or equal to 85 degrees so that the ratio of the output torque of the output shaft 811 when the working head 81 is at the limit position to the output torque of the output shaft 811 when the working head 81 is at the first position is greater than or equal to 0.5 and less than or equal to 1, thereby ensuring the torque transmission efficiency of the connection assembly. In some examples, the ratio of the output torque of the output shaft 811 when the working head 81 is located at the limit position to the output torque of the output shaft 811 when the working head 81 is located at the first position is greater than or equal to 0.6 and less than or equal to 1. In this example, when the working head 81 is located at the first position, the output torque of the output shaft 811 is greater than or equal to 2.5 N·m.

Figure 14:
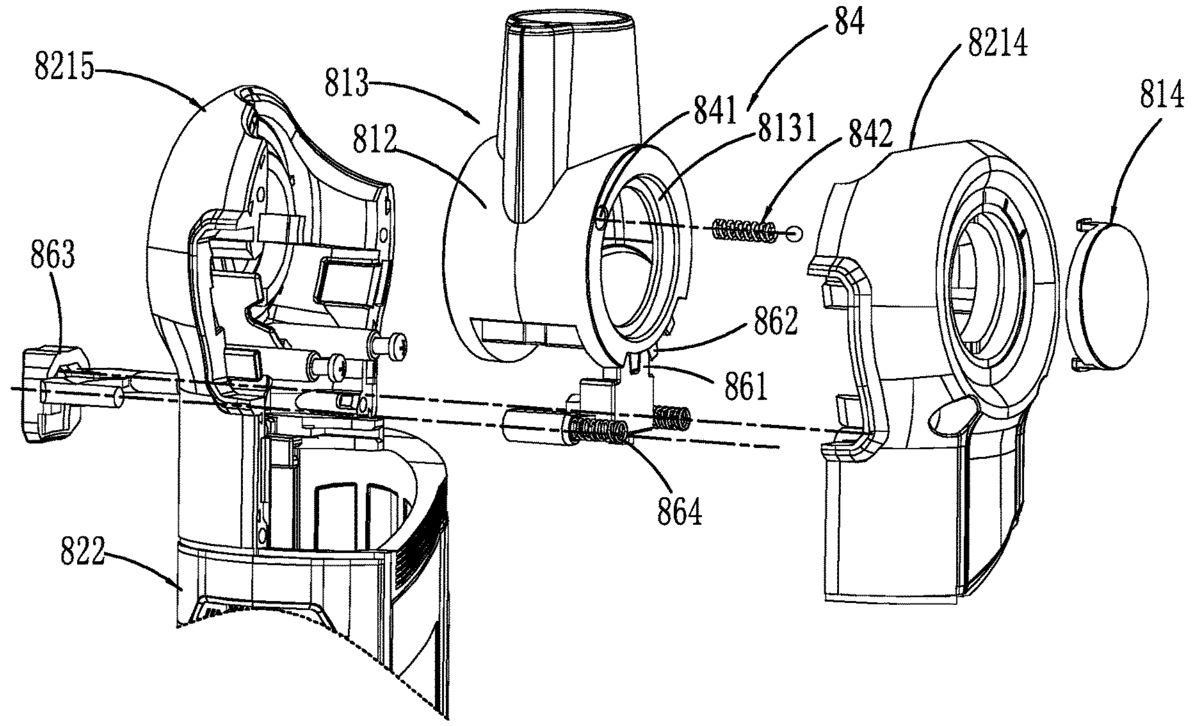
FIG. 14 is an exploded view of part of the structures of a power tool of an example of the present application and mainly shows a main housing, an output shaft housing, a positioning assembly, and a locking assembly.
Figure 15:
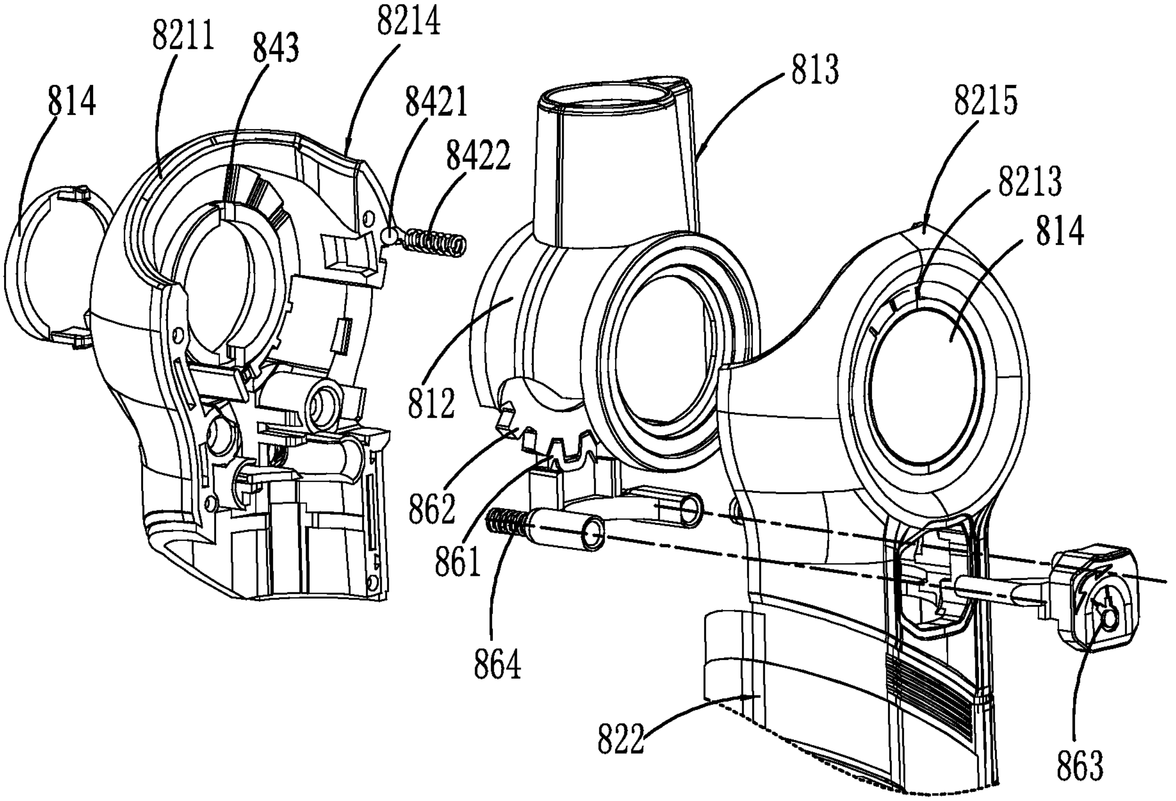
FIG. 15 is an exploded view of part of the structures of a power tool of an example of the present application from another perspective and mainly shows a main housing, an output shaft housing, a positioning assembly, and a locking assembly.

In this example, the limit position includes a first limit position for making the working head 81 move along a first direction about the first axis 801 to the limit. Multiple positions for locking the working head 81 may further be included between the first position and the first limit position. As shown in FIGS. 14 and 15, the power tool 8 further includes a positioning assembly 84. The positioning assembly 84 is used for positioning the rotational position of the working head 81 about the first axis 801 relative to the main housing 82. The positioning assembly 84 is disposed between the moving portion 812 and the connecting portion 821 and couples the moving portion 812 to the connecting portion 821 to stop the working head 81 at a set position.

The positioning assembly 84 includes a base 841, a positioning member 842, and a positioning groove 843. Multiple positioning grooves 843 are provided. The multiple positioning grooves 843 are disposed on the inner side of the connecting portion 821. In this example, multiple angle indicators 8213 are disposed on the outer side of the connecting portion 821, that is, a side observable by the user. The number of the angle indicators 8213 is the same as the number of the positioning grooves 843. The base 841 is disposed on the working head 81. In this example, the base 841 is disposed on the output shaft housing 813. The base 841 extends along the direction of the first axis 801. The positioning member 842 connects the moving portion 812 to the connecting portion 821. An end of the positioning member 842 is connected to the base 841, and the other end of the positioning member 842 is clutchably connected to the positioning groove 843. The positioning member 842 is movable in the base 841 relative to the moving portion 812. The movement of the positioning member 842 is caused by the rotation of the working head 81 about the direction of the first axis 801, and the shape of the multiple positioning grooves 843 corresponds to the shape of the positioning member 842. The positioning groove 843 is connected to the positioning member 842 to position the working head 81. The position of each positioning groove 843 corresponds to a different rotational angle of the working head 81.

When the working head 81 rotates from a certain angle to another angle, the positioning member 842 moves from a corresponding positioning groove 843 into the base 841 and then moves from the base 841 to another positioning groove 843. In this example, the positioning member 842 includes a rolling ball 8421 and a telescopic member 8422. When the working head 81 rotates, the rolling ball 8421 moves in an adjacent positioning groove 843 to a groove wall and is then pressed by the groove wall, and the rolling ball 8421 biases the telescopic member 8422. When the rolling ball 8421 enters one positioning groove 843, the telescopic member 8422 supports the rolling ball 8421 to keep the rolling ball 8421 in the positioning groove 843.

As shown in FIGS. 11 to 14, the power tool 8 further includes a locking assembly 86 for positioning the rotational position of the working head 81 about the first axis 801 relative to the main housing 82. It is to be understood that the limiting force provided by the positioning assembly 84 is not enough to ensure that the working head 81 and the main housing 82 do not move relative to each other during operation. That is to say, when the positioning assembly 84 completes the positioning, the relative motion between the working head 81 and the main housing 82 can be restricted, but when the torque output work is performed, the positioning state of the positioning assembly 84 is easily destroyed. The locking assembly 86 can provide a locking force sufficient to keep the working head 81 and the main housing 82 in a relatively locked state stably during operation.

The locking assembly 86 includes first teeth 861, second teeth 862, and a trigger 863. The first teeth 861 and the second teeth 862 are engaged with each other. The first teeth 861 are formed around the circumferential direction of the working head 81. In this example, the first teeth 861 are disposed on the output shaft housing 813 and are disposed on the outer circumference of a first through hole 8131. The trigger 863 is partially disposed outside the main housing 82 and is used for the user to trigger. The trigger 863 is connected to the second teeth 862. The trigger 863 includes a locked position and an unlocked position, where when the trigger 863 is at the locked position, the first teeth 861 and the second teeth 862 are engaged with each other. When the trigger 63 is triggered to move to the unlocked position, the second teeth 862 are displaced and disengaged from the first teeth 861, and at this time, the working head 81 can rotate about the first axis 801 relative to the main housing 82. The trigger 863 is disposed on the same side as a torque regulation operating member 8173 and a switching operating member. The trigger 863 is located at the upper position of the grip. The trigger 863 is disposed at a position where the thumb can operate when the palm of the user holds the grip.

In this example, the locking assembly 86 further includes a biasing element 864 connected to the trigger 863. The biasing element 864 provides a biasing force to move the trigger 863 from the unlocked position to the locked position, that is, a biasing force to move the second teeth 862 toward the first teeth 861. It is to be understood that the number of the positioning grooves 843 in the positioning assembly 84 corresponds to the number of the first teeth 861.

In some examples, the limit position includes a second limit position for making the working head 81 move along a second direction about the first axis 801 to the limit. The first limit position and the second limit position are located on two sides of the first position. The first position is an intermediate position, the first limit position is in front of the first position, and the second limit position is behind the first position. The second limit position and the first limit position may be arranged symmetrically with respect to the first position, or the second limit position may be closer to the first position than the first limit position.

As shown in FIGS. 11 to 13, the drive mechanism 83 further includes a transmission assembly 831. The transmission assembly 831, the electric motor 832, and the direct current power supply 833 are connected from top to bottom in sequence. In this example, the transmission assembly 831, the electric motor 832, and the direct current power supply 833 are disposed in the second accommodation space, or at least most of the transmission assembly 831, the electric motor 832, and the direct current power supply 833 are disposed in the second accommodation space.

The transmission assembly 831 is used for transmitting power outputted by the electric motor 832 to the output shaft 811. The transmission assembly 831 is disposed between the output shaft 811 and the electric motor 832, and the transmission assembly 831 is at least partially or entirely disposed in the grip 822 and may be at least partially disposed in the connecting portion 821. In this example, the transmission assembly 831 adopts a planet gear deceleration mechanism. The transmission assembly 831 includes a planetary gearset 8311 of three stages or more than three stages and a gearbox housing 8312. An internal tooth structure is disposed on the inner side of the gearbox housing 8312. Since the working principle of the planet gear deceleration mechanism and the principle of deceleration generated by the transmission assembly or the speed regulation principle of the planet gear have been fully disclosed to those skilled in the art, a detailed description is omitted herein for the brevity of the description.

As shown in FIGS. 10 and 11, the distance between the rear end of the main housing and the front end of the output shaft when the working head 81 is at the first position is defined as the maximum distance L4. The distance between the first axis 801 and the front end of the output shaft 811 is L5. It is to be explained that in this example, a clamping portion for clamping the accessory is formed on a shaft body of the output shaft, and the front end of the output shaft is the front end of the shaft body. In some examples, the output shaft includes the shaft body and the clamping portion, the clamping portion is fixedly connected to the shaft body, and the front end of the output shaft is the frontmost part of the shaft body and the clamping portion. In some examples, the output shaft includes the shaft body and the clamping portion, and the clamping portion is detachably connected to the shaft body. That is to say, after the clamping portion of the power tool is detached, when the shaft body can still drive the accessory to work, the front end of the output shaft is the front end of the shaft body. In this example, the ratio of the distance L5 between the first axis 801 and the front end of the output shaft 811 to the maximum distance L4 is greater than or equal to 0.1 and less than or equal to 0.4. In some examples, the ratio of the distance L5 between the first axis and the front end of the output shaft to the maximum distance L4 is greater than or equal to 0.1 and less than or equal to 0.35. In some examples, the ratio of the distance L5 between the first axis and the front end of the output shaft to the maximum distance L4 is greater than or equal to 0.1 and less than or equal to 0.3 so that the working head is more suitable for a narrow space. In this example, the distance L5 between the first axis and the front end of the output shaft is less than or equal to 65 mm. In some examples, the distance L5 between the first axis and the front end of the output shaft is less than or equal to 60 mm. In some examples, the distance L5 between the first axis and the front end of the output shaft is less than or equal to 55 mm. In some examples, the distance L5 between the first axis and the front end of the output shaft is less than or equal to 50 mm.

In some examples, the distance L5 between the first axis 801 and the rear end of the main housing is less than or equal to 230 mm. In some examples, the distance L5 between the first axis 801 and the rear end of the main housing is less than or equal to 210 mm. In some examples, the distance L5 between the first axis 801 and the rear end of the main housing is less than or equal to 195 mm.

In this example, the direct current power supply 833 is built in the main housing. When the working head 81 is at the first position, the ratio of the length L4 of the direct current power supply 833 to the maximum distance L4 between the rear end of the main housing and the front end of the output shaft is greater than or equal to 0.1 and less than or equal to 0.6. In some examples, when the working head 81 is at the first position, the ratio of the length L4 of the direct current power supply 833 to the maximum distance L4 between the rear end of the main housing and the front end of the output shaft is greater than or equal to 0.1 and less than or equal to 0.5. In some examples, when the working head 81 is at the first position, the ratio of the length L4 of the direct current power supply 833 to the maximum distance L4 between the rear end of the main housing and the front end of the output shaft is greater than or equal to 0.1 and less than or equal to 0.4 so that the whole power tool is compact. The length L4 of the direct current power supply 833 is the length of the battery or battery pack of the direct current power supply 833 along the direction of the third axis 803. In this example, the weight of the power tool is less than or equal to 400 g. In some examples, the direct current power supply 833 is a battery pack, the battery pack is detachably mounted in the main housing, and the direct current power supply 833 is partially mounted in the main housing. In this case, the length L4 of the direct current power supply 833 is the length of the battery pack.

As shown in FIGS. 8 to 10 and FIGS. 14 and 15, a window portion 814 is disposed in the main housing 82 and used for displaying the internal structure of the power tool 8. In this example, the window portion 814 is disposed on the connecting portion 821, and the position of the window portion 814 is opposite to the position of the connection assembly 90 so that part of the structure of the connection assembly 90 is displayed in the window portion.

As shown in FIGS. 8 to 10, the power tool 8 further includes a switch assembly including at least two switches that are used for controlling different functions of the electric motor and a controller. The switch assembly includes operating members and corresponding switch elements. The operating members include a main switch operating member 8171, the torque regulation operating member 8173, and the switching operating member. The main switch operating member 8171 corresponds to a main switch and is used for controlling the start and stop of the electric motor 832. The torque regulation operating member 8173 and the switching operating member send different signals to the controller to control the output torque of the output shaft 811 and switch a forward rotation state and a reverse rotation state of the electric motor 832. The main switch operating member 8171 is disposed at the joint of the grip 822 and the connecting portion 821. In this example, the main switch operating member 8171 is disposed on a side adjacent to the window portion 814. The switching operating member is coupled to the main switch operating member 8171. The torque regulation operating member 8173 is disposed on the grip 822. In some examples, the torque regulation operating member 8173 is disposed near the lower end of the grip 822. The torque regulation operating member 8173 is disposed on the same side as the window portion 814. That is to say, the main switch operating member 8171 and the torque regulation operating member 8173 are disposed on adjacent sides. It is to be understood that the main switch operating member 8171 and the torque regulation operating member 8173 are staggered at an angle on the main housing 82 around the third axis 803. In this example, a torque indicator light 8172 is disposed near the torque regulation operating member 8173. Different display states of the torque indicator light 8172 indicate different output torque. The torque indicator light 8172 and the torque regulation operating member 8173 are disposed on the same side of the grip 822. In other alternative examples, the switching operating member and the main switch operating member 8171 are disposed independently and disposed on the same side of the grip 822.

In this example, the torque regulation operating member 8173 is integrated with a locking function, or a lock is disposed near the torque regulation operating member 8173. That is, the lock can control the connection and disconnection of the electrical connection between the electric motor and the direct current power supply.

The controller is disposed on a control circuit board 816. The control circuit board 816 includes a printed circuit board (PCB) or flexible printed circuit (FPC) board. The controller uses a dedicated control chip, for example, a single-chip microcomputer and a microcontroller unit (MCU).

The operating members are connected to the corresponding switches. The switches are electrically connected to the controller. According to different signals sent by the switches, the controller performs corresponding control actions on the electric motor.

The control circuit board 816 is electrically connected to the drive mechanism 83. The control circuit board 816 is disposed in the grip 822 and is parallel or basically parallel to the drive mechanism 83 or the third axis 803. Being basically parallel refers to the case where the included angle between the control circuit board 816 and the drive mechanism 83 or the third axis 803 is less than or equal to 10 degrees.

As shown in FIG. 9, the power tool 8 further includes a lighting assembly 815. The lighting assembly 815 is disposed on the working head 81 and provides light for illuminating a working region. The lighting assembly 815 rotates with the working head 81 about the first axis 801 and always provides light for illuminating the working position of the output shaft 811. The lighting assembly 815 includes a lighting element for emitting light, and the lighting element is disposed in the output shaft housing 813 and located on a side of the output shaft 811. In other alternative examples, the lighting element is disposed around the output shaft.

As shown in FIGS. 11 to 15, in this example, the connecting portion 821 includes a left connecting portion 8214 and a right connecting portion 8215 that are assembled with each other. The right connecting portion 8215 is integrally formed with the grip 822. That is to say, the basically cylindrical grip 822 is integrally formed with the right connecting portion 8215. The left connecting portion 8214 is detachably connected to the right connecting portion 8215, so as to increase the strength of the main housing 82. The bottom of the main housing 82 further includes a lower cover 823 connected to the lower opening of the right connecting portion 8215. The charging interface 8231 is disposed on the lower cover 823.

To make the main housing more comfortable for the user to hold, the outer circumference of the main housing is covered with soft materials, such as rubber, silicone, and soft plastic. In this example, the soft materials are disposed near the grip and the working head.

What is claimed is:

1. A screwdriver, comprising:

a main housing provided with an accommodation space;

a drive mechanism at least partially accommodated in the accommodation space and comprising a motor;

a working head comprising an output shaft, wherein the output shaft is driven by the drive mechanism to rotate about an output axis, a mounting slot for mounting a screwdriver bit is formed at an end of the output shaft opposite the drive mechanism; and a connection assembly comprising an input portion connected to the drive mechanism and an output portion connected to the output shaft, wherein the connection assembly rotates the working head around a first axis perpendicular to the main housing and the drive mechanism, a torque transmission path extends from the drive mechanism through the connection assembly to the output shaft, and at least a component in the torque transmission path is allowed to deform or to be displaced along a direction of the torque transmission path when the working head rotates about the first axis relative to the main housing, and the working head comprises a limit position where the working head moves to the limit position around the first axis, and an included angle α between an axis of the motor and an axis of the output shaft is greater than or equal to 0 degrees and less than or equal to 85 degrees when the working head is located at the limit position, a ratio of output torque of the output shaft when the working head is located at the limit position to output torque of the output shaft when the working head is located at a first position, where the axis of the input portion is parallel to or coincident with the axis of the output portion, is greater than or equal to 0.5.

2. The screwdriver of claim 1, wherein the working head comprises a limit position where the working head moves to a limit around the first axis, and an included angle α between an axis of the input portion and an axis of the output portion is less than or equal to 70 degrees when the working head is located at the limit position.

3. The screwdriver of claim 1, wherein the limit position comprises a first limit position where the working head moves to a limit along a first direction around the first axis, and the first limit position is located on a side of the first position.

4. The screwdriver of claim 3, wherein the limit position further comprises a second limit position where the working head moves to a limit along a second direction opposite to the first direction around the first axis, and the first limit position and the second limit position are located on two sides of the first position.

5. The screwdriver of claim 1, wherein when the working head is located at the first position, output torque of the output shaft is greater than or equal to 2.5 N·m.

6. The screwdriver of claim 1, wherein a ratio of a distance L1 between the first axis and a front end of the output shaft to a maximum distance L between a rear end of the main housing and the front end of the output shaft is greater than or equal to 0.1 and less than or equal to 0.4.

7. The screwdriver of claim 6, wherein the ratio of the distance L1 between the first axis and the front end of the output shaft to the maximum distance L between the rear end of the main housing and the front end of the output shaft is greater than or equal to 0.1 and less than or equal to 0.3.

8. The screwdriver of claim 1, wherein the drive mechanism comprises a direct current power supply.

9. The screwdriver of claim 8, wherein the direct current power supply comprises a battery and has a nominal voltage less than or equal to 7.2 V.

10. The screwdriver of claim 8, wherein a ratio of a length L2 of the direct current power supply to a maximum distance L between a rear end of the main housing and a front end of the output shaft is greater than or equal to 0.1 and less than or equal to 0.6.

11. The screwdriver of claim 1, wherein when the working head rotates about the first axis relative to the main housing, the connection assembly is allowed to deform.

12. The screwdriver of claim 1, wherein when the working head rotates about the first axis relative to the main housing, at least one of the drive mechanism, the input portion, the output portion, and the output shaft is allowed to be displaced along the direction of the torque transmission path.

13. A screwdriver, comprising:

a main housing provided with an accommodation space;

a drive mechanism at least partially accommodated in the accommodation space and comprising a direct current power supply and a motor;

a working head comprising an output shaft, wherein the output shaft is driven by the drive mechanism to rotate about an output axis, a mounting slot for mounting a screwdriver bit is formed at an end of the output shaft opposite the drive mechanism; and a connection assembly connecting the output shaft to the drive mechanism and comprising at least one connector, wherein the at least one connector provides at least two orthogonal rotational degrees of freedom to rotate the working head about a first axis relative to the main housing, the connection assembly comprises a first universal joint, a second universal joint, and a connecting rod connecting the first universal joint and the second universal joint, and the first universal joint comprises a first spherical retaining frame comprising a first spherical base and a corresponding first ball head, and the second universal joint comprises a second spherical retaining frame comprising a second spherical base and a corresponding second ball head.

14. A screwdriver, comprising:

a main housing provided with an accommodation space;

a drive mechanism at least partially accommodated in the accommodation space and comprising a direct current power supply and a motor;

a working head comprising an output shaft, wherein the output shaft is driven by the drive mechanism to rotate about an output axis, a mounting slot for mounting a screwdriver bit is formed at an end of the output shaft opposite the drive mechanism; and a connection assembly connecting the output shaft to the drive mechanism and comprising at least one connector, wherein the at least one connector provides at least two orthogonal rotational degrees of freedom to rotate the working head around a first axis perpendicular to the main housing, wherein a ratio of a distance L1 between the first axis and a front end of the output shaft to a maximum distance L between a rear end of the main housing and the front end of the output shaft is greater than or equal to 0.1 and less than or equal to 0.4, and the working head comprises a limit position where the working head moves to the limit position around the first axis, and an included angle α between an axis of the motor and an axis of the output shaft is less than or equal to 85 degrees when the working head is located at the limit position, and a maximum output torque of the output shaft is greater than or equal to 2.5 N·m.

15. The screwdriver of claim 14, wherein the ratio of the distance L1 between the first axis and the front end of the output shaft to the maximum distance L between the rear end of the main housing and the front end of the output shaft is greater than or equal to 0.1 and less than or equal to 0.3.

16. The screwdriver of claim 14, wherein the working head comprises a limit position where the working head moves to a limit around the first axis, and an included angle α between an axis of the motor and an axis of the output shaft is less than or equal to 85 degrees when the working head is located at the limit position.

17. The screwdriver of claim 14, wherein the direct current power supply comprises a battery and has a nominal voltage less than or equal to 7.2 V.

* * * * *